US008727251B2

(12) United States Patent
Loos et al.

(10) Patent No.: US 8,727,251 B2
(45) Date of Patent: May 20, 2014

(54) KITCHEN SHREDDER

(75) Inventors: Gail D. Loos, Centennial, CO (US); James E. Jones, Golden, CO (US); James P. Monahan, Denver, CO (US); Jeffery L. Schaefer, Lakewood, CO (US); Shane Korthuis, Aurora, CO (US)

(73) Assignee: Ingenious Marketing LLC, Denver, CO (US)

( * ) Notice: Subject to any disclaimer, the term of this patent is extended or adjusted under 35 U.S.C. 154(b) by 447 days.

(21) Appl. No.: 13/200,808

(22) Filed: Sep. 30, 2011

(65) Prior Publication Data

US 2012/0091244 A1 Apr. 19, 2012

(51) Int. Cl.
*B02C 19/00* (2006.01)

(52) U.S. Cl.
USPC .............................. 241/100; 29/428; 241/243

(58) Field of Classification Search
USPC .................................... 241/243, 100; 29/428
See application file for complete search history.

(56) References Cited

U.S. PATENT DOCUMENTS

| | | | | |
|---|---|---|---|---|
| 3,280,211 | A * | 10/1966 | McCaulay | 585/723 |
| 3,762,256 | A * | 10/1973 | Frantz | 83/356.3 |
| 3,991,944 | A * | 11/1976 | Baikoff | 241/36 |
| 5,148,996 | A * | 9/1992 | Fletcher et al. | 241/36 |
| 5,913,484 | A | 6/1999 | Kurtz | |
| 5,992,777 | A * | 11/1999 | Aagaard | 241/236 |
| 7,216,824 | B2 * | 5/2007 | Katsumura et al. | 241/243 |
| 7,607,600 | B2 | 10/2009 | Salgado et al. | |

FOREIGN PATENT DOCUMENTS

| | | |
|---|---|---|
| JP | 2001-149807 | 6/2001 |
| JP | 2088-238010 | 10/2008 |
| JP | 2011-131169 | 7/2011 |

* cited by examiner

*Primary Examiner* — Mark Rosenbaum
(74) *Attorney, Agent, or Firm* — Startup IP Law, LLC; Terrence M. Wyles, Esq.

(57) ABSTRACT

An apparatus for pre-composting organic material, comprising: a housing with two openings and a pre-composting means between the two openings wherein kitchen scraps may be fed in the first opening and the pre-composted scraps exit the second opening. In an embodiment of the present invention the pre-composter includes: a lid assembly which may facilitate feeding scraps into the pre-composter; a hopper and blade assembly for pre-composting or cutting and shredding the scraps; a component tray for securing the housing to the hopper; a bin for collecting the pre-composted scraps; and a crank assembly which delivers rotational power to the blade assembly.

47 Claims, 26 Drawing Sheets

KITCHEN SHREDDER

I. BACKGROUND OF THE INVENTION a. Field of the Invention

The field of the present invention generally relates to devices which reduce the size of food items. The field of the present invention specifically relates to new field—pre-composting organic material. In particular, a pre-composter including two openings and pre-composting means therebetween wherein organic materials from the kitchen are shredded and/or cut into smaller pieces which are then composted. Shredding kitchen scraps may be for the additional purpose of simply lower the volume of household garbage. More particularly the invention relates to a hand-operated pre-composter for kitchen use.

It is important to note that "pre-composting" has different definitions in the public domain. For the purposes of the present invention pre-composting means shredding, cutting, mashing and/or other similar means of lowering the volume and/or increasing the surface area, of organic kitchen scraps. A smaller volume of garbage is typically easier to transport. An increased surface area of organic matter typically decomposes in a notable shorter period of time. Such decomposition may be utilized for the generation of methane and/or may be for composting purposes wherein the byproduct is a soil amendment.

The background of the invention is in one respect extensive and in another limited. Composting organic material has been done for centuries wherein a soil amendment is derived from the composting process. The soil amendment may vary depending upon the time and extent of decomposition the organic material has undergone.

Recently backyard or even in-house composting containers have been made and sold to facilitate home composting. These are designed to receive organic materials and over time decomposition thereof, and with some containers means by which the materials may be rotated by the container, render a soil amendment.

The rate of decomposition of the organic material will vary depending upon a number of factors well known in the art. Regardless, the rate of decomposition will be lowered, and under many circumstances lowered significantly, if the surface area of the organic material is increased.

General awareness of human impact of the environment has become acute. Composting organic material by individual households has a number of environmental benefits well known in the art. As of late, an environmental desire to merely lower the volume and/or weight of the garbage has been identified as such a benefit.

The containers and products on the market related to composting do not include a product designed specifically to lower the volume and/or weight of organic material handled by garbage pick-up services and/or increasing the surface are of organic materials to expedite the decomposition process. In this respect, the subject invention relates to a new product concept which does not have a background which includes similar products with such product goals.

II. SUMMARY OF THE INVENTION

An apparatus for pre-composting organic material, comprising: a housing with two openings and a pre-composting means between the two openings wherein kitchen scraps may be fed in the first opening and the pre-composted scraps exit the second opening. In an embodiment of the present invention the pre-composter includes: a lid assembly which may facilitate feeding scraps into the pre-composter; a hopper and blade assembly for pre-composting or cutting and shredding the scraps; a component tray for securing the housing to the hopper; a bin for collecting the pre-composted scraps; and a crank assembly which delivers power to the blade assembly.

The pre-composter is also designed to temporarily store pre-composted material and dispense the material to a storage container with a volume larger than the bin's.

The precomposter may be a counter-top apparatus which may improve public compliance with composting or waste diversion requirements by providing a sanitary storage and transport method while reducing the volume of typical food waste.

Objects and advantages pertaining to the present inventions disclosed herein may become apparent upon referring to the exemplary embodiments illustrated in the drawings herein and disclosed in the following detailed description and/or claims.

III. BRIEF DESCRIPTION OF THE DRAWINGS

FIG. 1*a* is a front perspective view of an embodiment of the subject invention.

FIG. 1*b* is a top view of an embodiment of the subject invention.

FIG. 1*c* is a bottom view of an embodiment of the subject invention.

FIG. 1*d* is a left view of an embodiment of the subject invention.

FIG. 1*e* is a front perspective view of an embodiment of the subject invention.

FIG. 1*f* is a right view of an embodiment of the subject invention.

FIG. 1*g* is a back view of an embodiment of the subject invention.

FIG. 1*h* is a front perspective view of a housing.

FIG. 2*a* is perspective view of a main lid.

FIG. 2*b* is a perspective view of a hatch lid.

FIG. 2*c* is a bottom perspective detailed view of a main lid hinge pin.

FIG. 2*d* is a top perspective detailed view of a main lid hinge pin.

FIG. 2*e* is a side perspective detailed view of a main lid hinge.

FIG. 2*f* is an exploded view of a hatch lid, a main lid and a spring loaded main lid hatch latch FIG. 2*g* is a perspective view of a main lid FIG. 3*a* is a perspective exploded view of a bin and a bin handle assembly FIG. 3*b* is a top view of a bin FIG. 3*c* is a bottom perspective view of a bin FIG. 4 is a perspective view of a component tray FIG. 5*a* is a perspective exploded view of a hopper and hopper handle FIG. 5*b* is a transparent top perspective view of a hopper FIG. 6*a* is a perspective exploded view of a blade assembly FIG. 6*b* is a side view of a blade.

FIG. 6*c* is a perspective side view of a strut

IV PARTS LIST

Figure 1B:
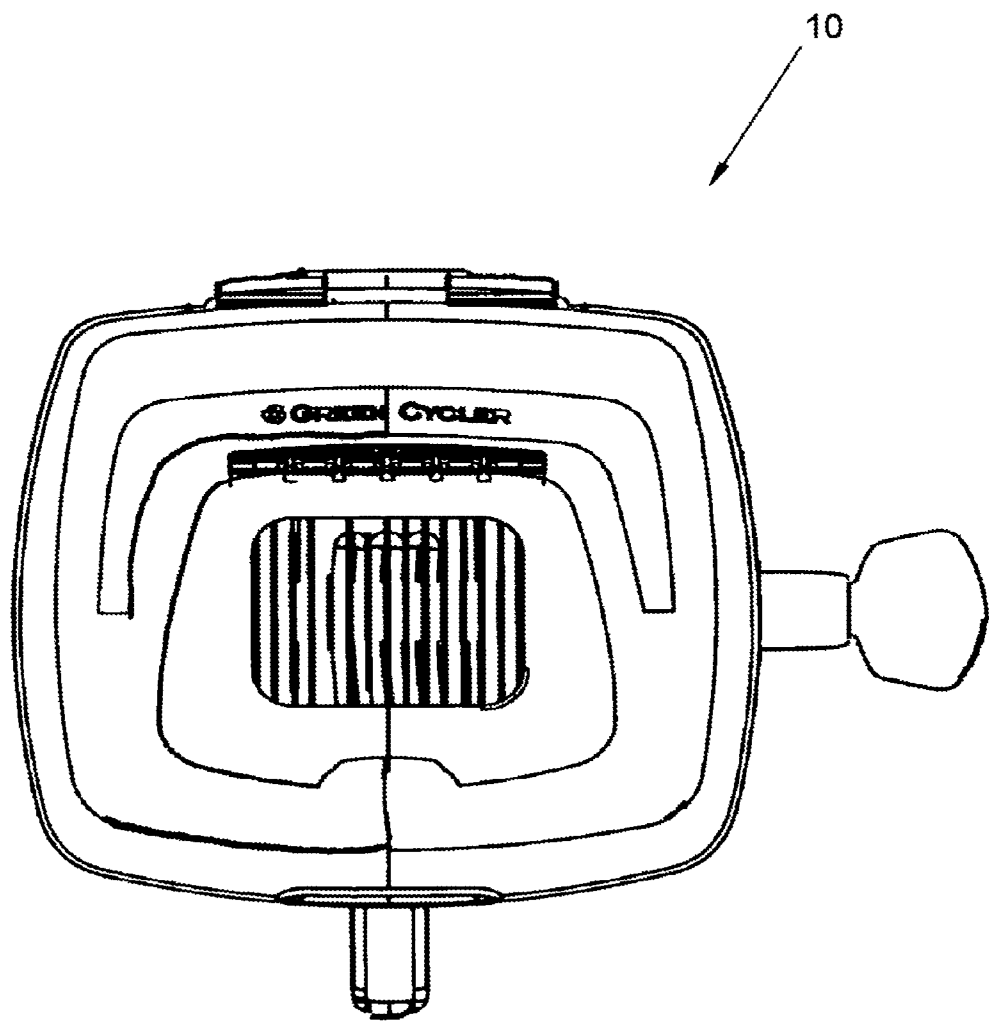
Figure 1C:
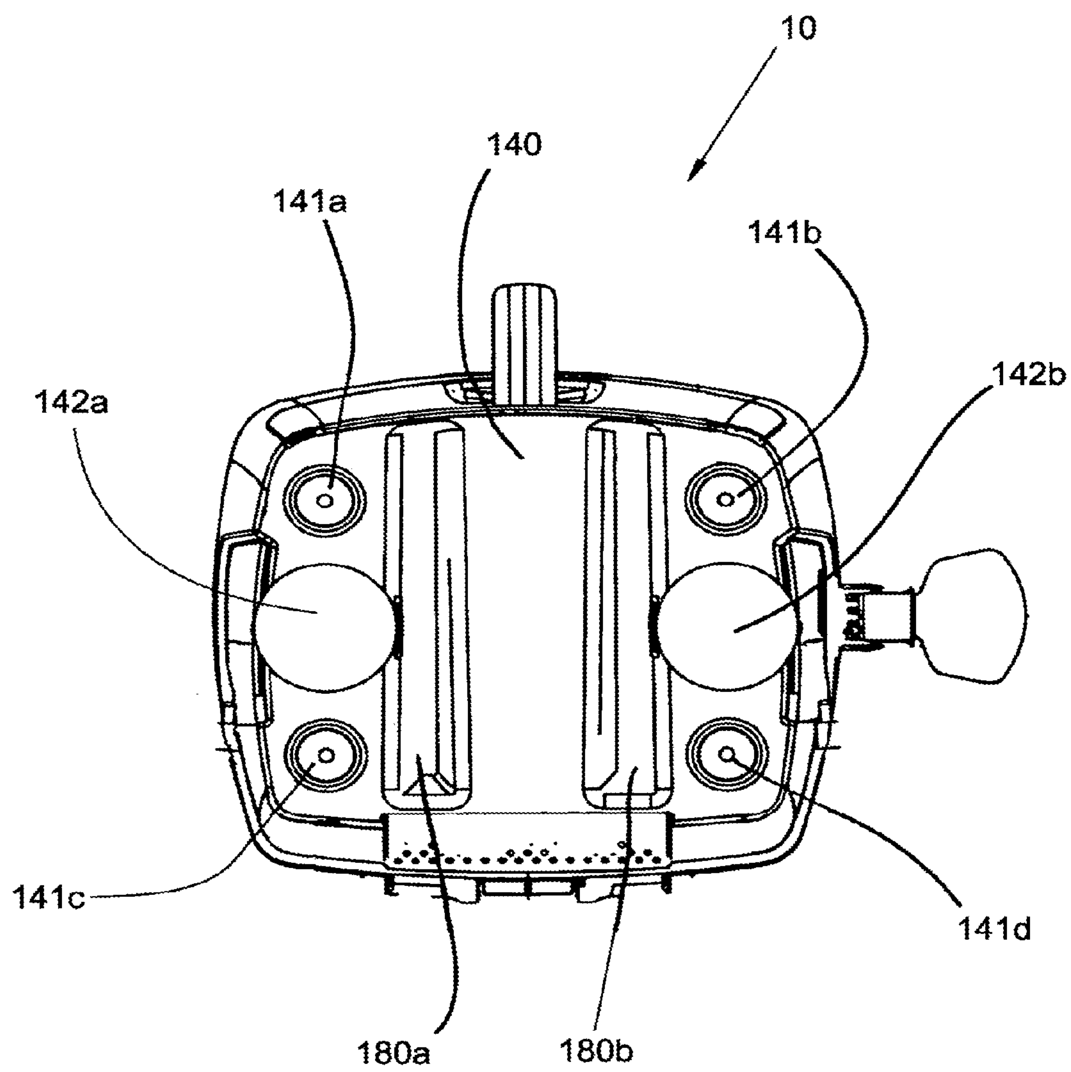
Figure 1D:
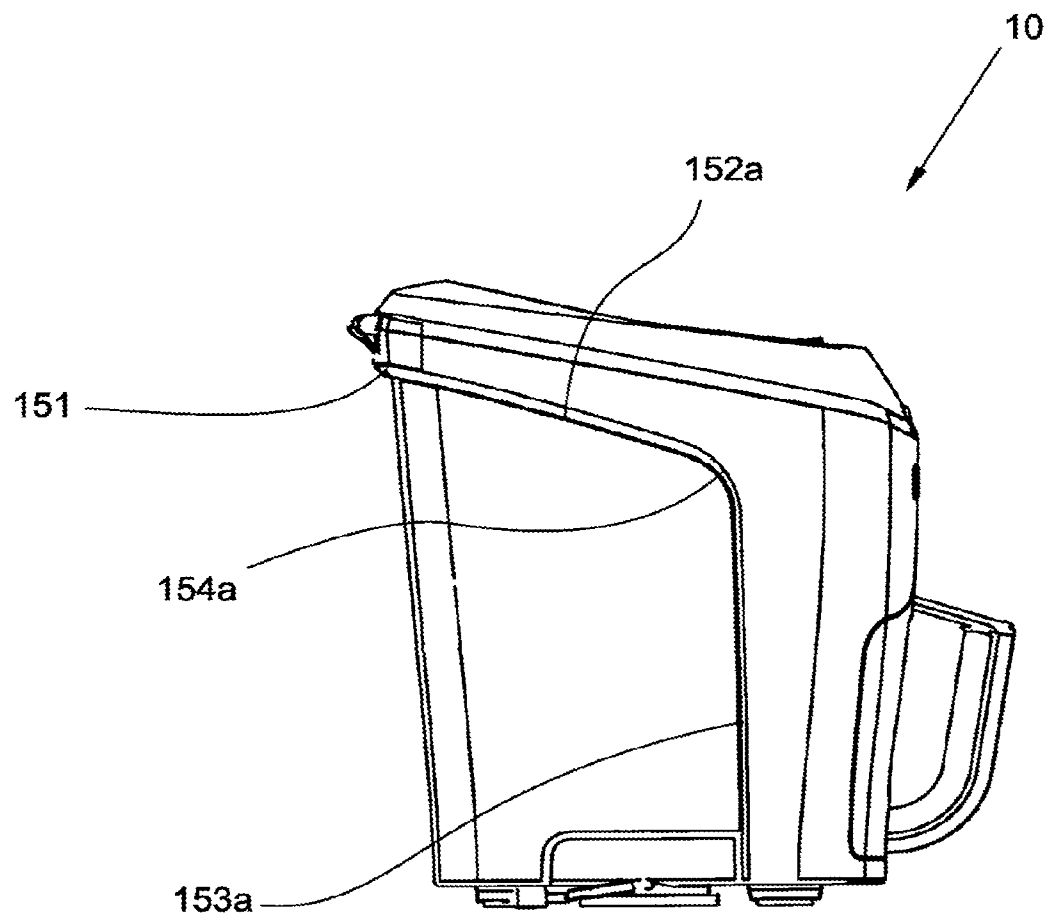
Figure 1E:
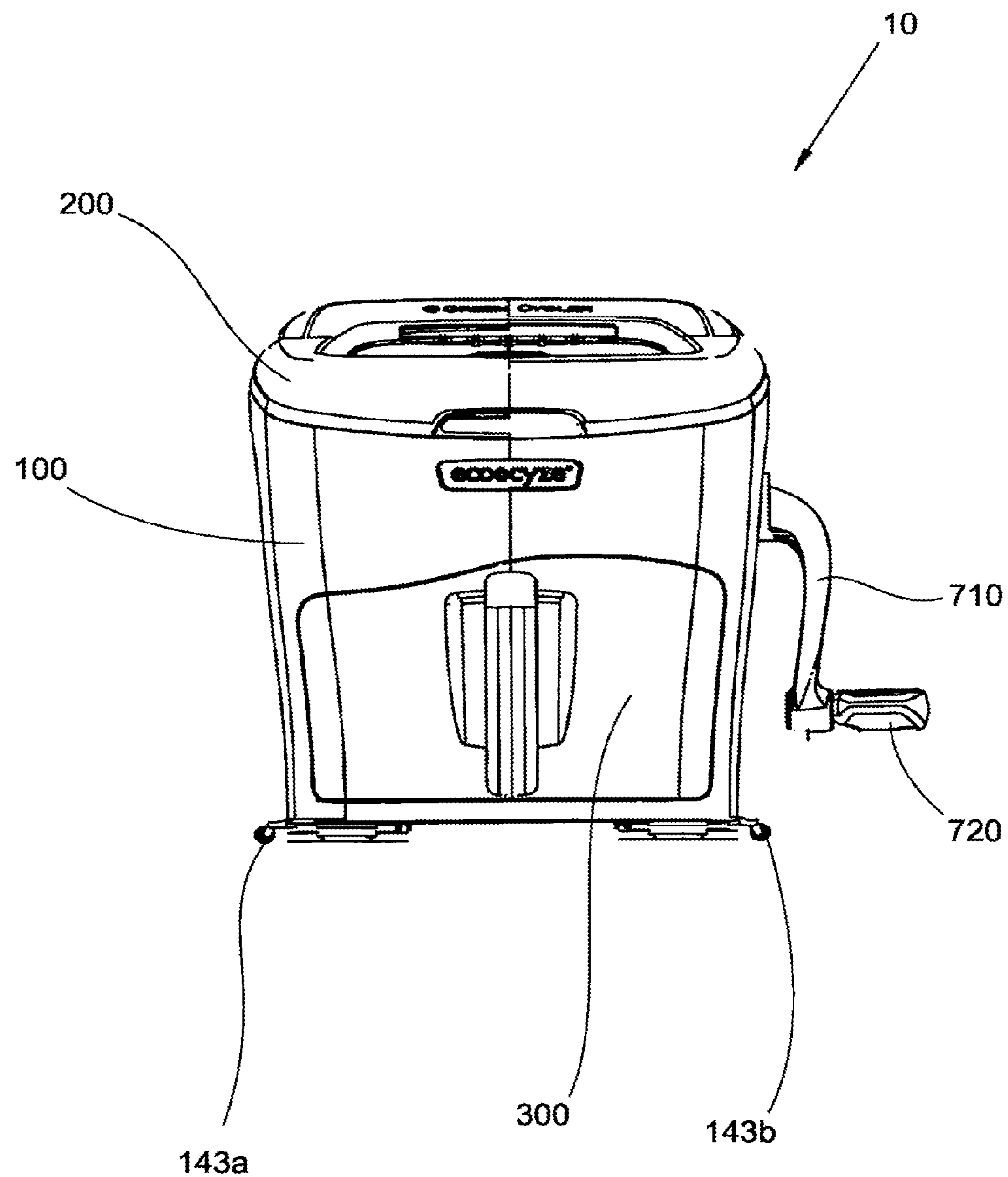
Figure 1F:
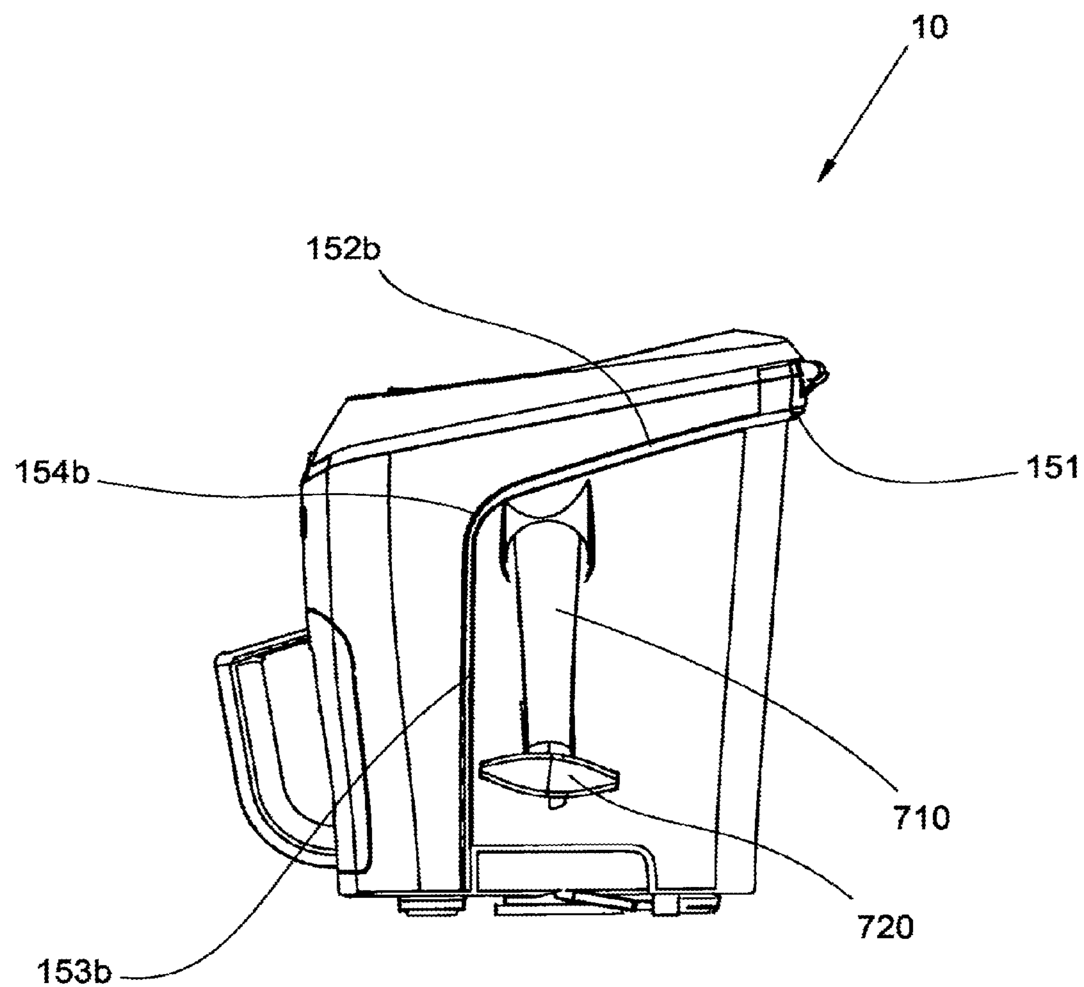
Figure 1G:
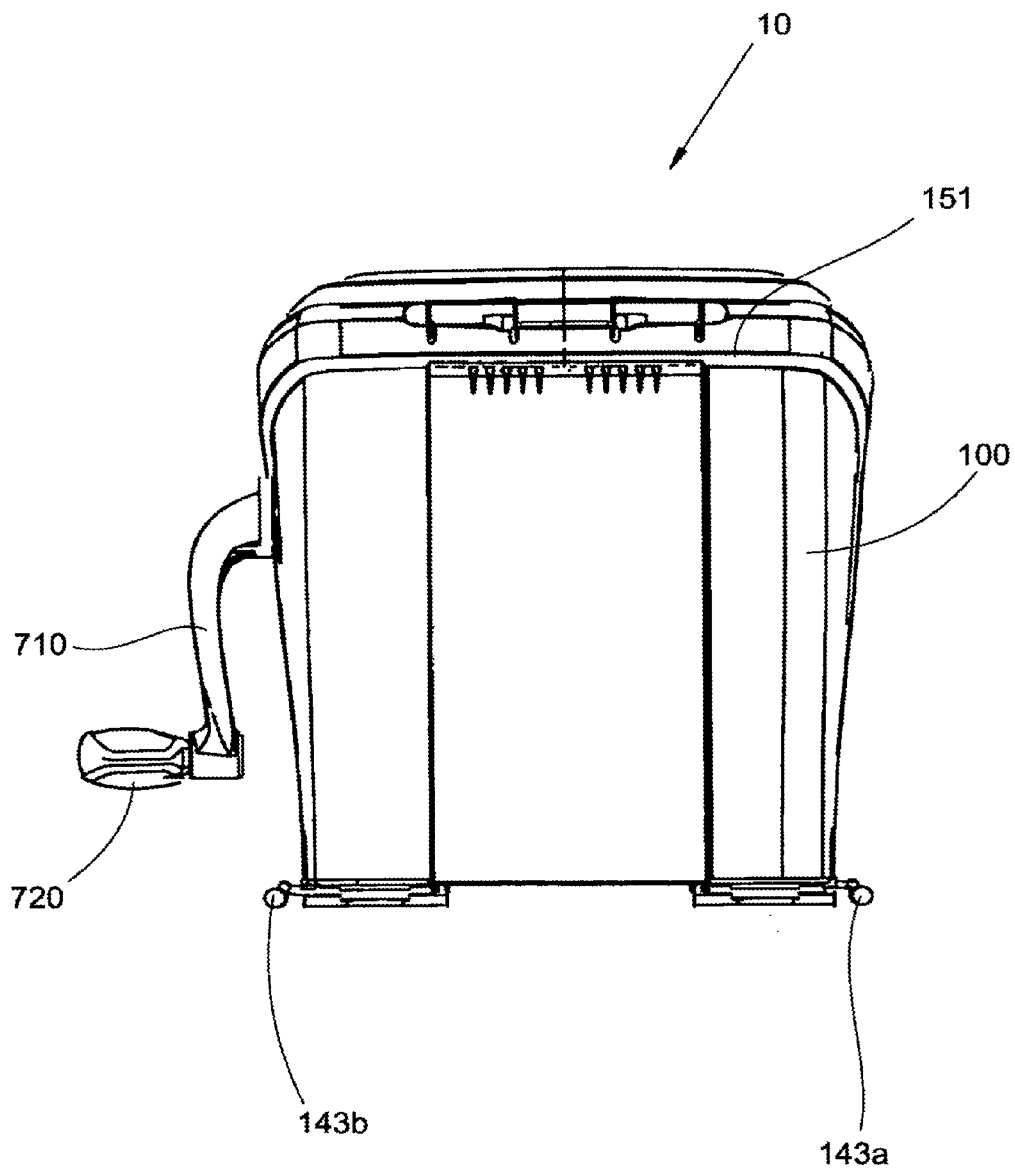
Figure 1H:
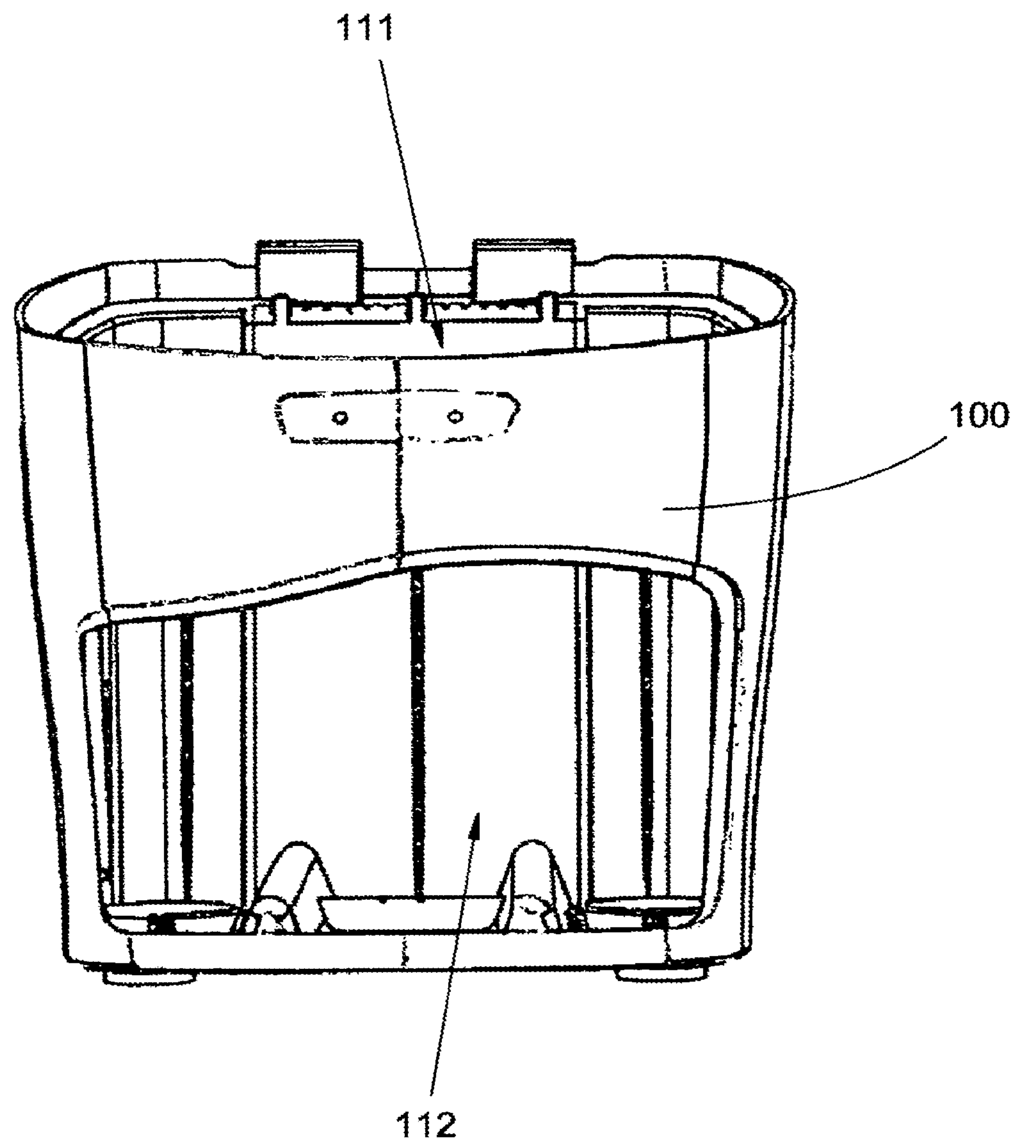
Figure 2A:
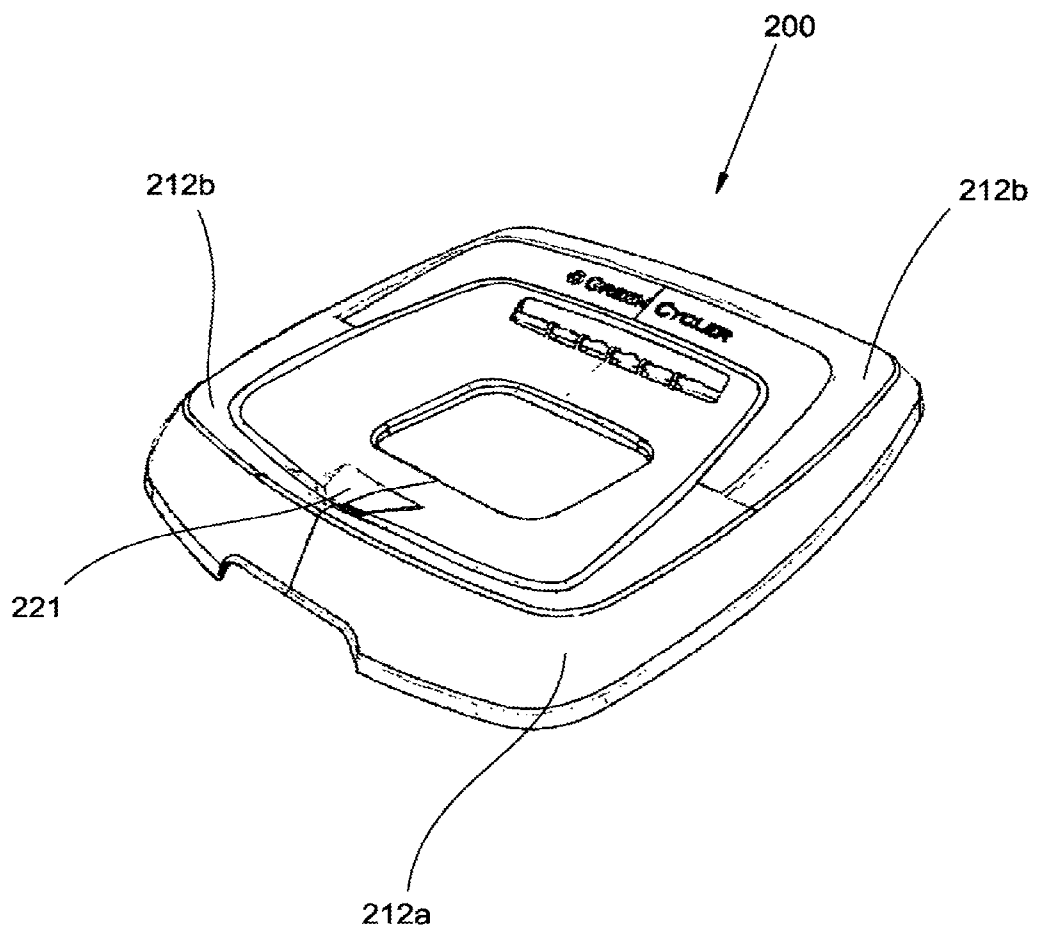
Figure 2B:
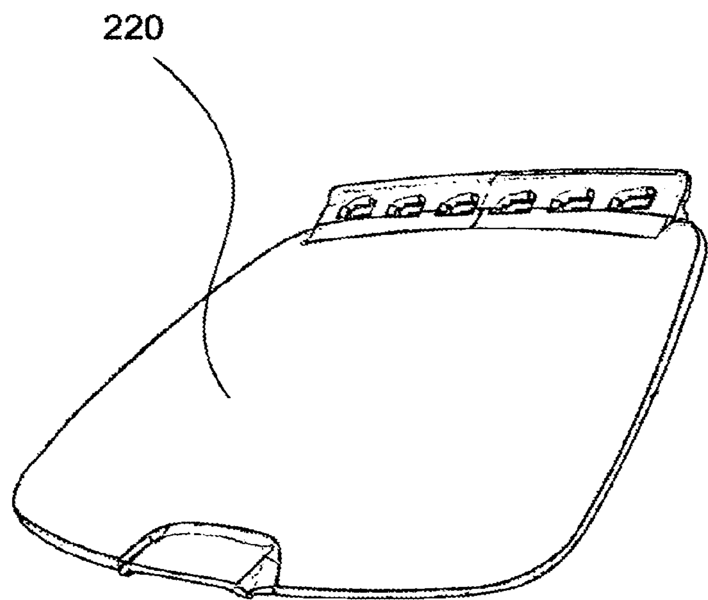
Figure 2C:
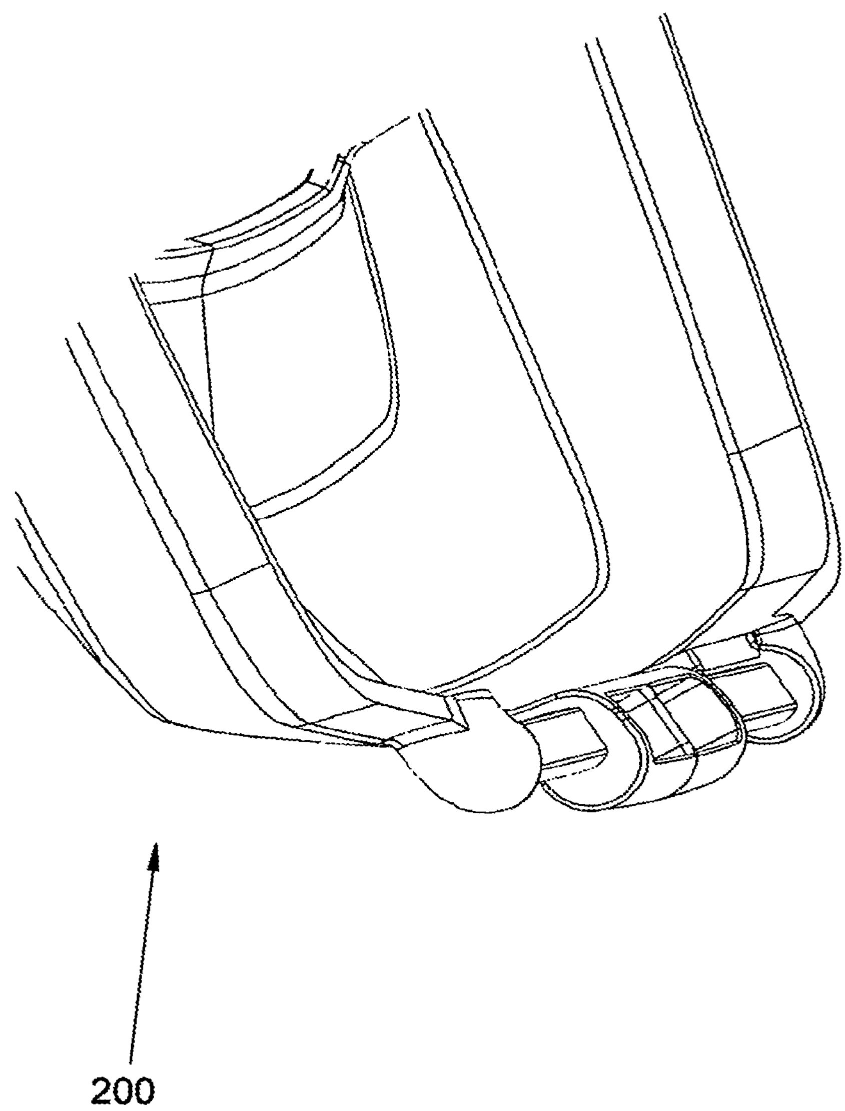
Figure 2D:
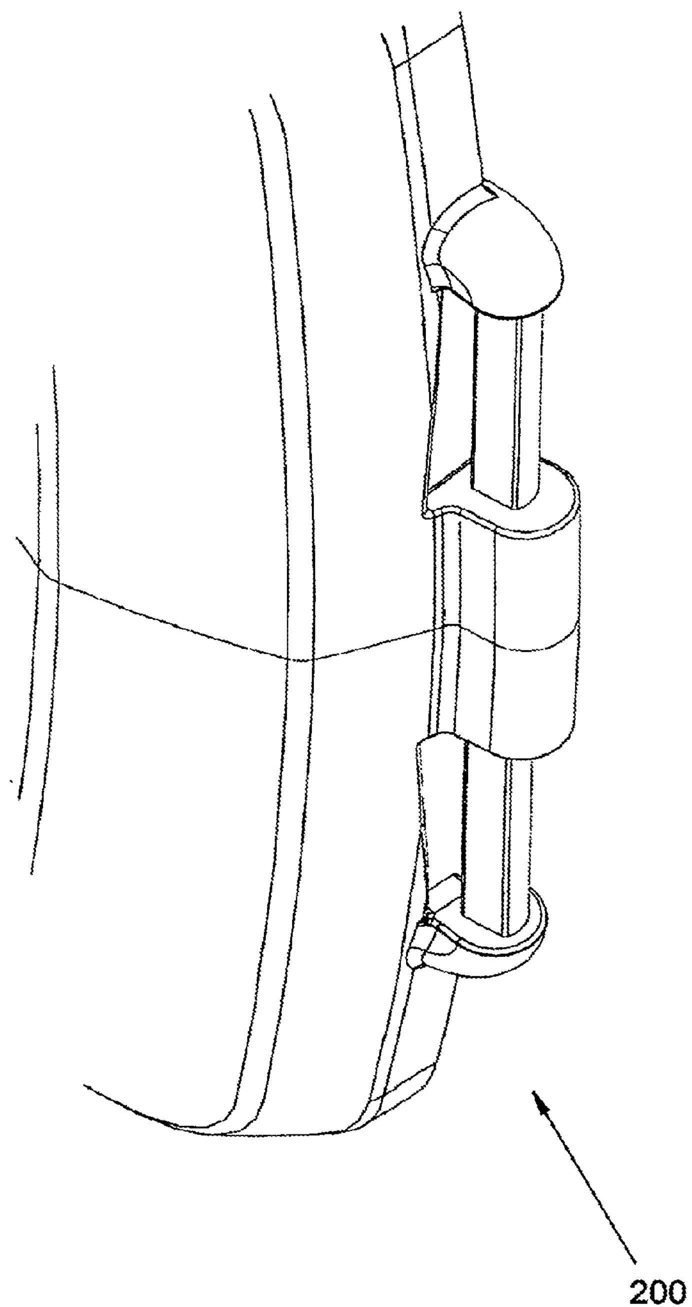
Figure 2E:
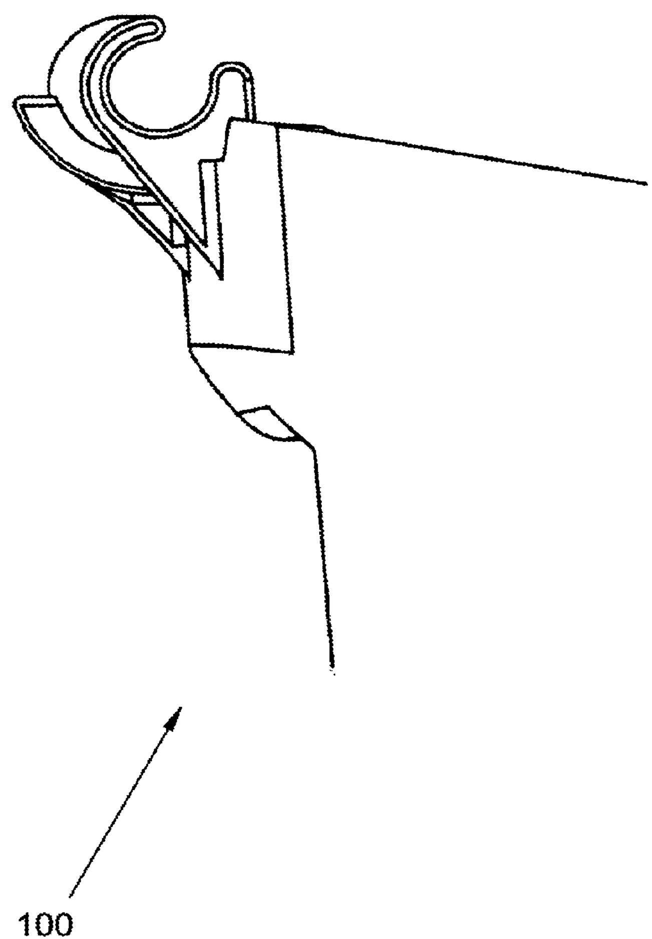
Figure 2F:
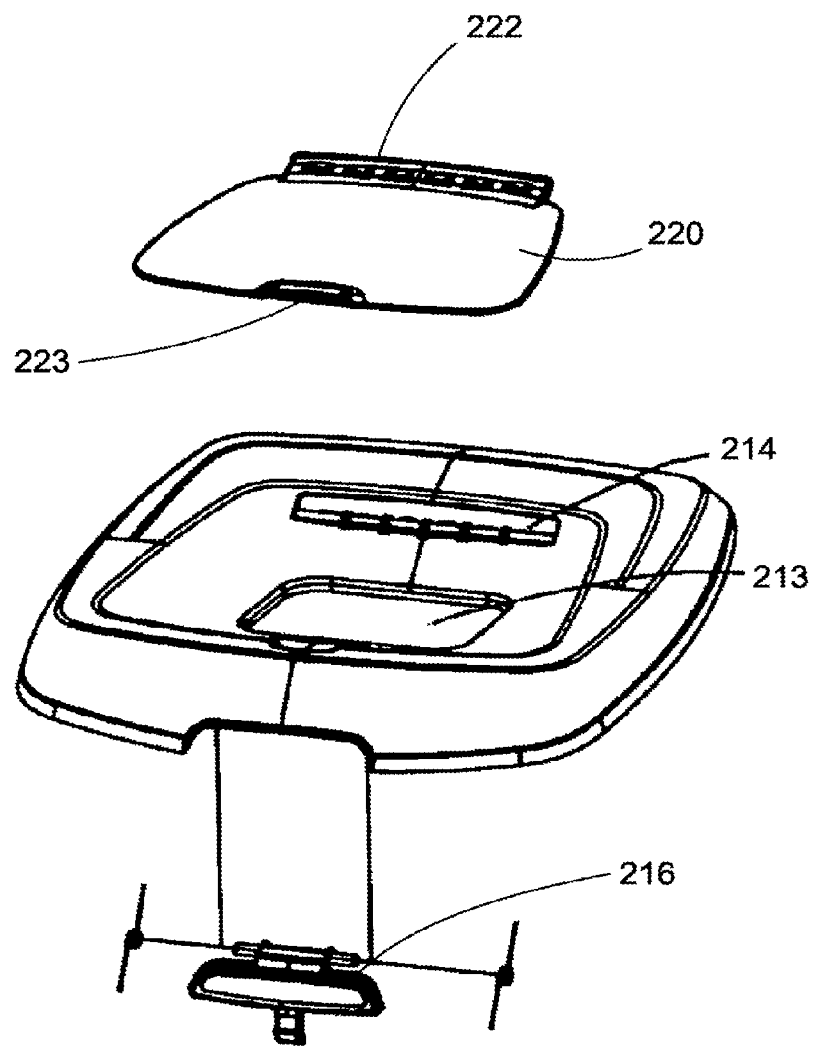
Figure 2G:
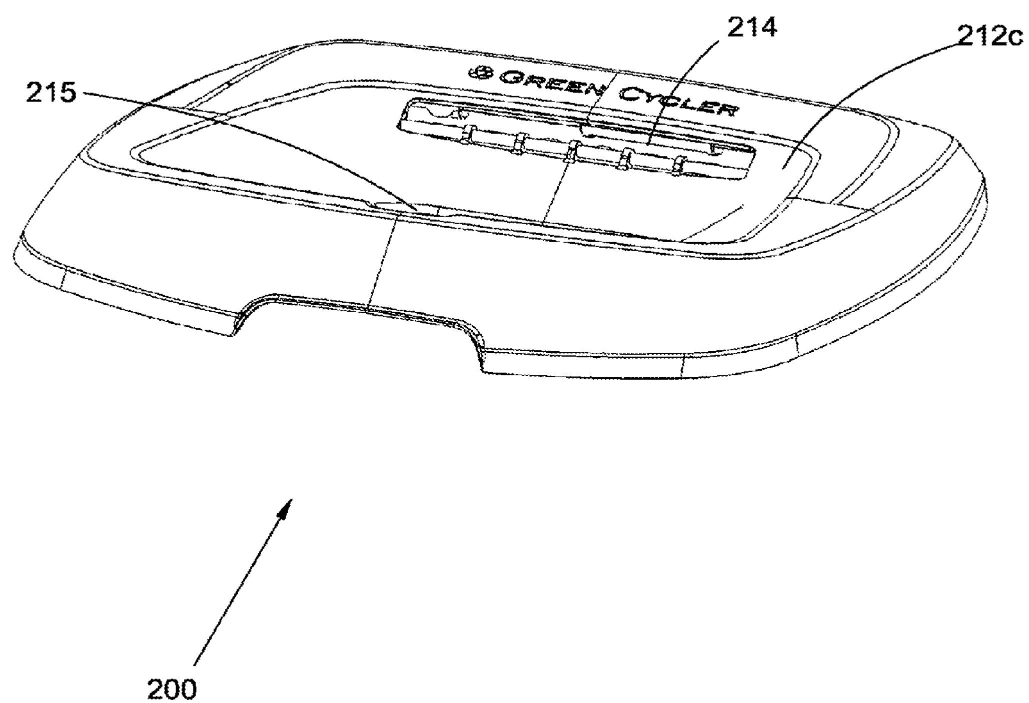
Figure 3A:
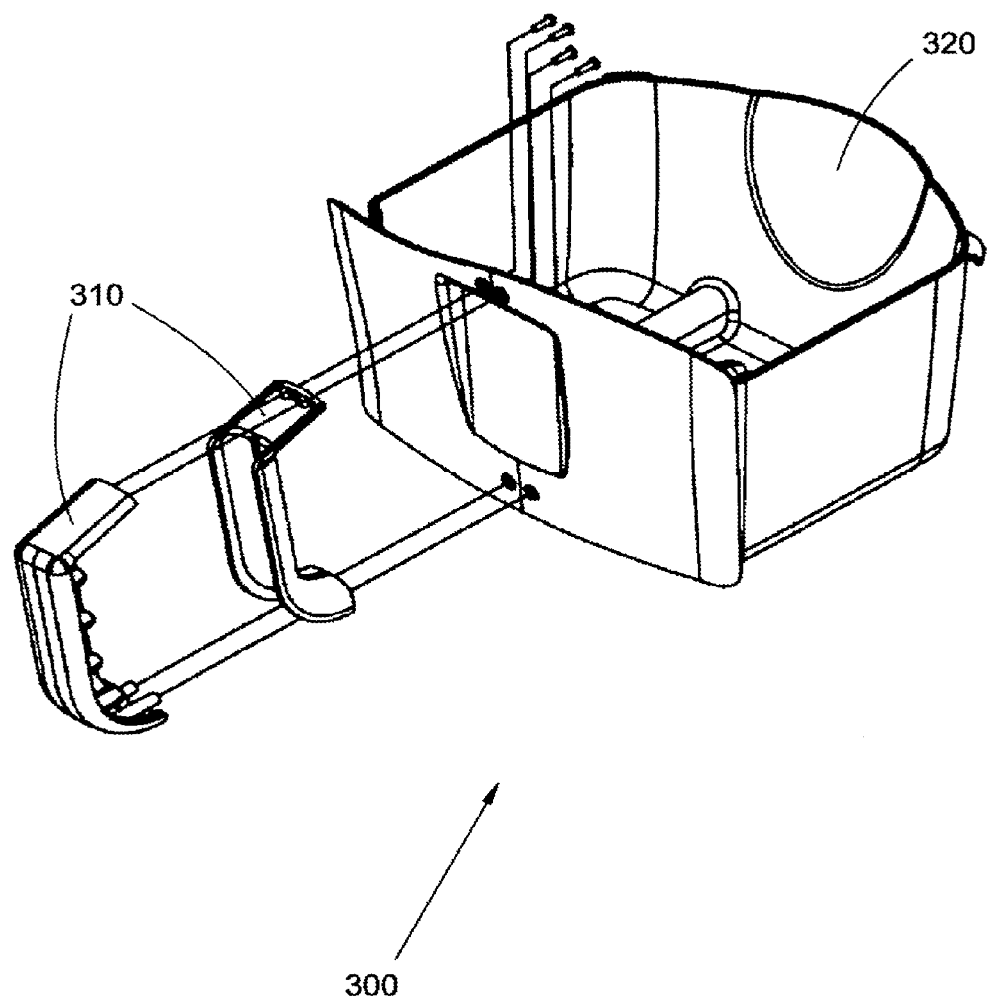
Figure 3B:
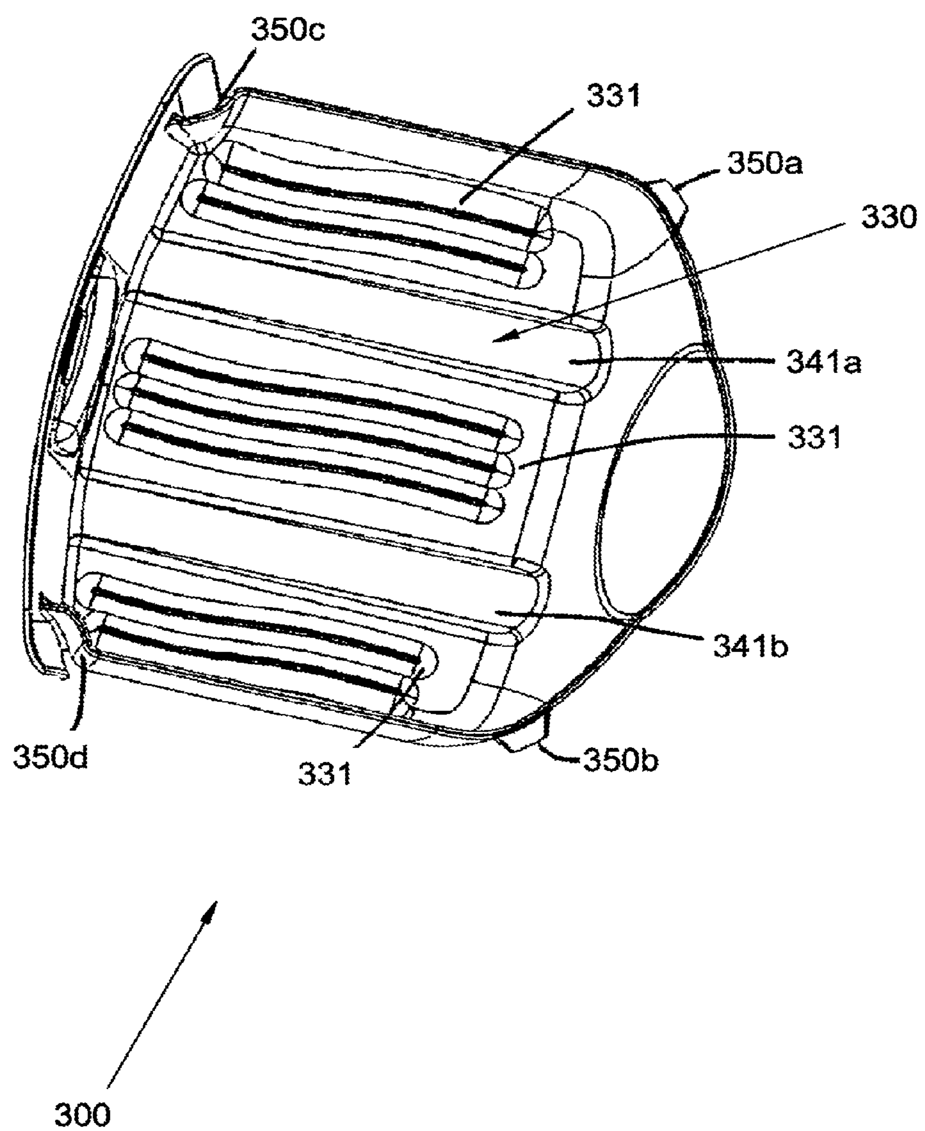
Figure 3C:
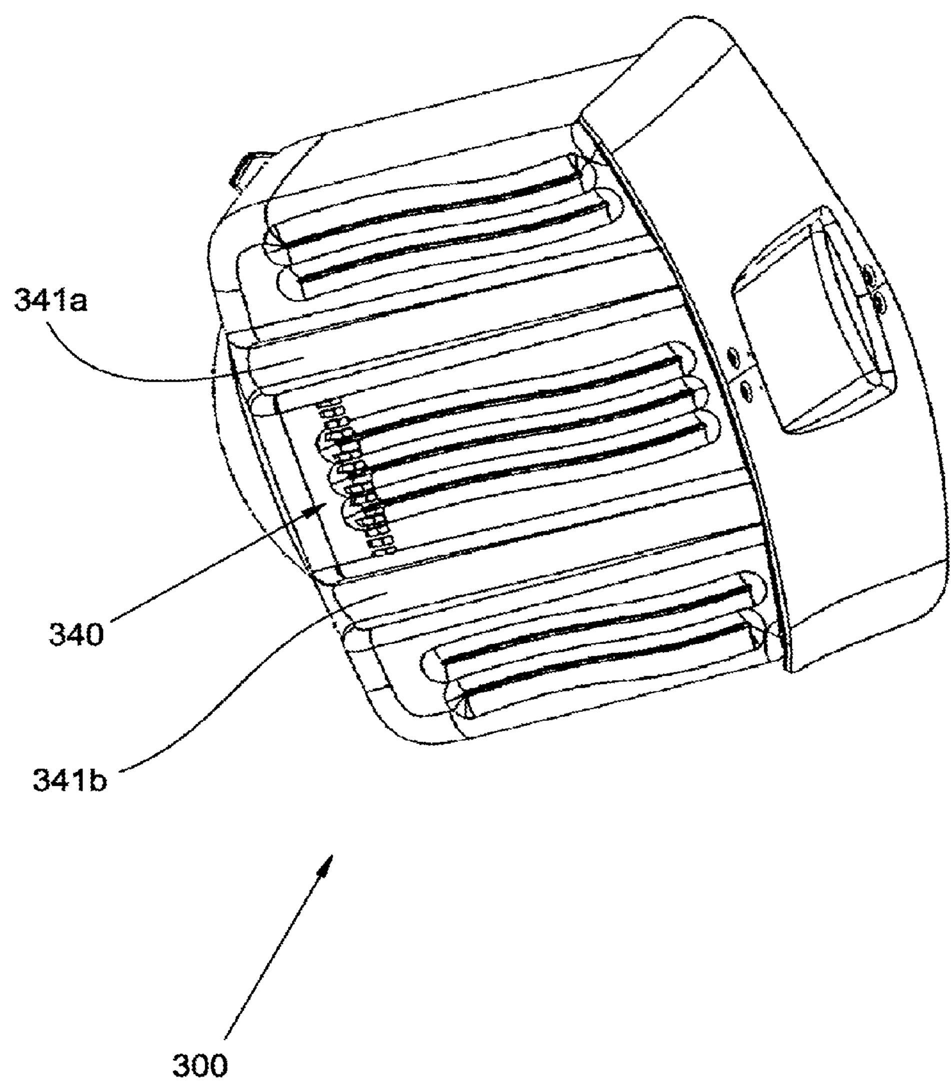
Figure 4:
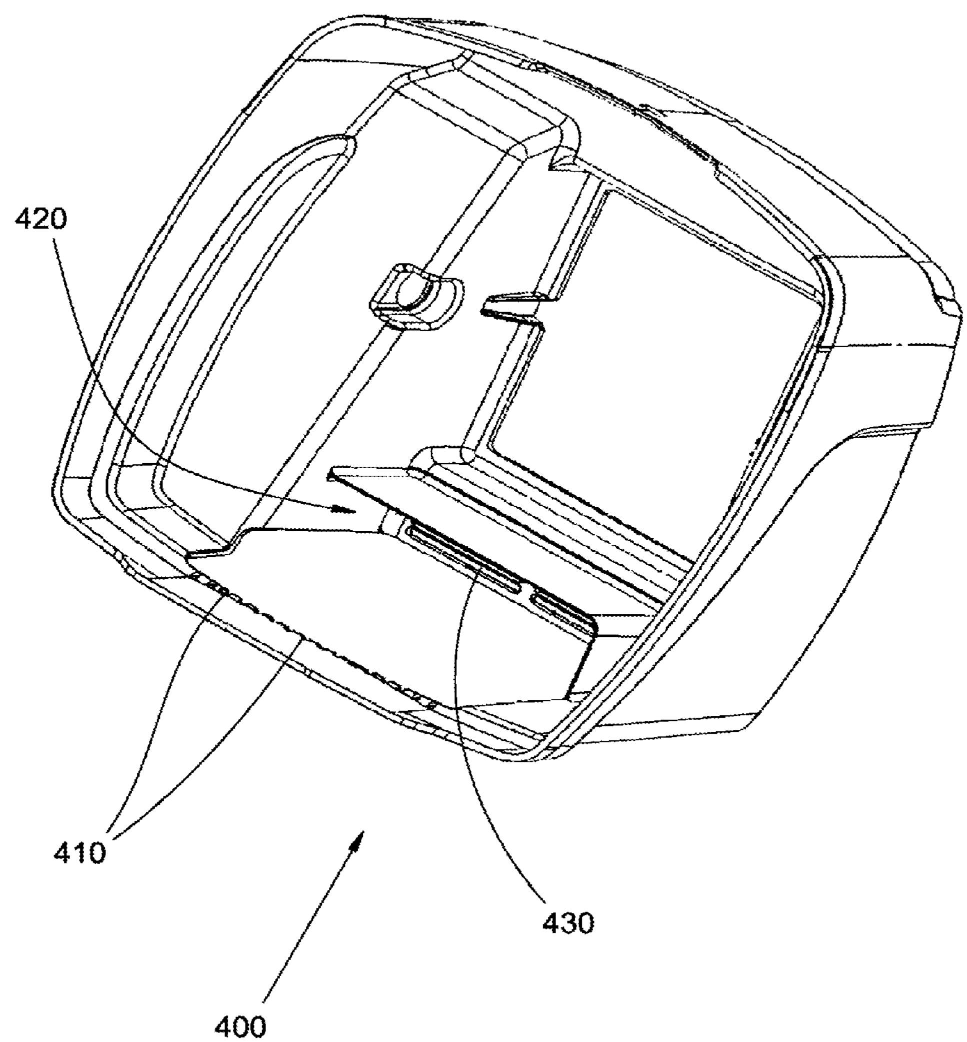
Figure 5A:
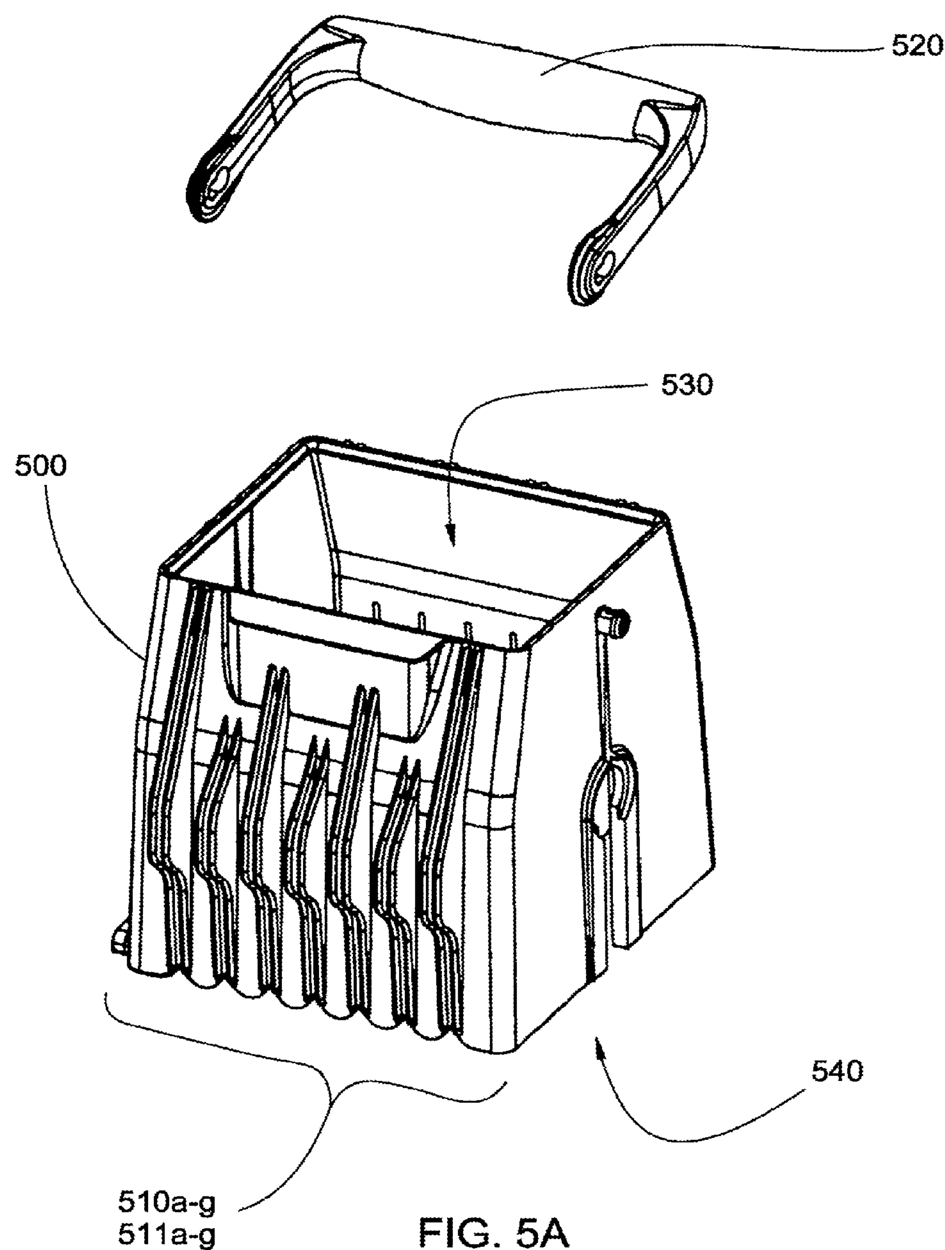
Figure 5B:
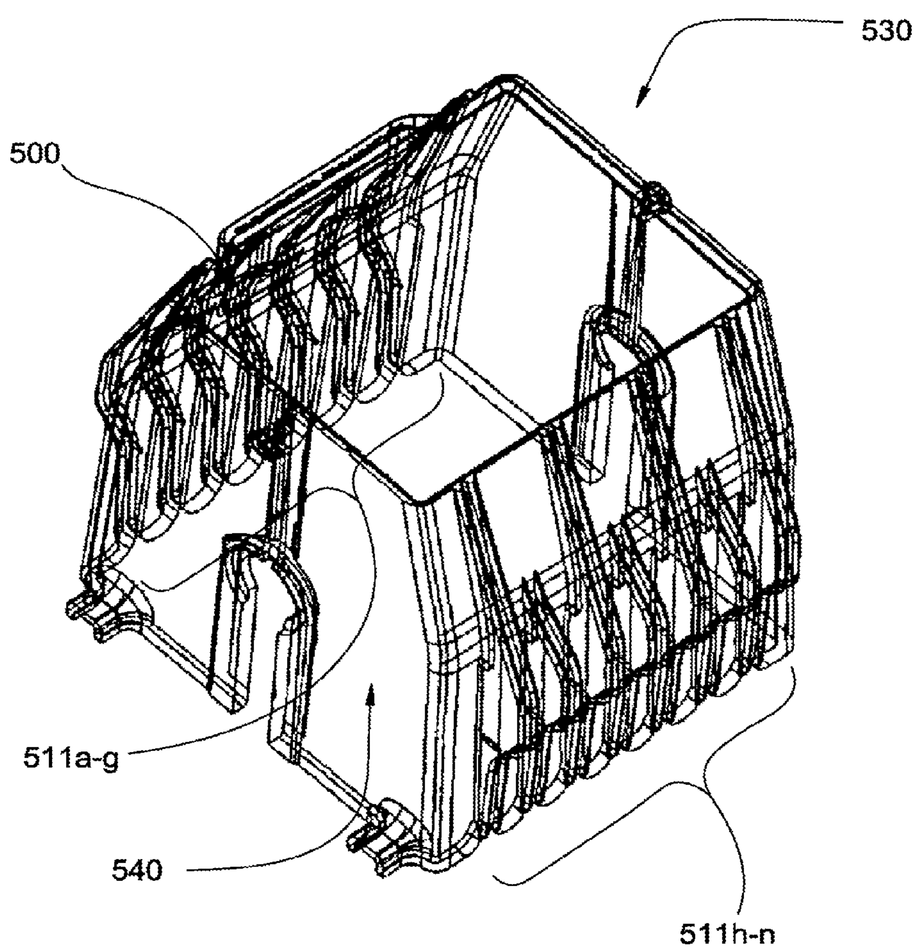

10 Pre-composter
100 Housing
111 First Opening
112 Second Opening
113 Axle Opening
114 Crank Opening
120 Continuous Beveled Edge
130 Main Lid Hinge
131*a* and 131*b* main lid hinge arcuate cups
132*a* and 132*b* main lid hinge arcuate gaps
140 Housing Outer Base
141*a-d* Housing Feet (4 each)
142*a* and 142*b* Suction Cups
143*a* and 143*b* Suction Cup Levers
150 Beveled Ridge
151 Back Beveled Ridge Segment
152*a* and *b* Side Beveled Ridge Horizontal Segments
153*a* and *b* Side Beveled Ridge Vertical Segments
154*a* and *b* Side Beveled Ridge Arcuate Segments
160 Housing Inside Bottom Surface
170 Housing vents
180*a-b* Bin Interface Channels
200 Lid Assembly
210 Main Lid
211 Main Lid Hinge Pin
211*a* and 211*b* main lid hinge pin Double-D segments
212*a* Main Lid Outer Beveled Surface
212*b* Main Lid First Inner Beveled Surface
212*c* Main Lid Second Inner Beveled Surface
213 Main Lid Aperture
214 Main Lid Hatch Hinge
215 Main Lid Hatch Gap
216 Main Lid Main Latch
220 Hatch Lid
221 Hatch Lid Latch
222. Hatch Lid Hinge Pin
223 Hatch Lid Tab
300 Bin
310 Bin Handle Assembly
320 Bin Pour Spout
330 Bin Inside Bottom
331 Bin Inside Bottom Ridges
340 Bin Outside Bottom Surface
341*a-b* Housing Interface Channels
350*a-d* Bin Tabs
400 Component Tray
410 Perforations
420 Block Receptacle
430 Tray Vents
500 Hopper
510 Flanged Ribs a-n
511 Flanged Channels a-f
511 Flanged Channels g-n
520 Hopper Handle
530 Hopper Upper Opening
540 Hopper Lower Opening
600 Blade Assembly
610 Axle
620*a-h* Blades
621*a-d* curve blade segments
622 hex-shaped blade aperture
623*a-b* hooks
630*a-f* Struts
631*a-f* strut holes
631*g-n* strut holes
700 Crank Assembly
710 Crank Arm
720 Crank Handle
800 Crank Motor

V. DETAILED DESCRIPTION OF THE INVENTION AND EMBODIMENTS THEREOF

Referring now to the drawings, written descriptions of exemplary embodiments of the present invention follow.

Precomposter 10 may include a housing 100, a lid assembly 200, a bin 300, a component tray 400, a hopper 500, a blade assembly 600 and a crank assembly 700. The construction of composter 10 components may be as follows: housing 100 includes first opening 111 and lid assembly 200 is attached on top of opening 111; lid assembly 200 includes main lid 210 and hatch lid 220 mounted within maid lid 210 wherein opening hatch lid 220 provides access to first opening 111; housing 100 also includes second opening 112 on a side of housing 100 and below opening 111 wherein bin 300 may reside and be removed from; component tray 400 may be affixed to the inner surface of housing 100; hopper 500 may be affixed to component tray 400; blade assembly 600 may substantially reside within, and may be mounted to, hopper 500 and may be rotatably mounted to housing 100; and crank assembly 700 may substantially reside external to housing 100 and may be connected to axle 610 which has assembled thereto blades 620 and struts 630, wherein when crank assembly 700 is rotated, in either direction, blades 620 rotate and in conjunction with fixed struts 630 and in conjunction with hopper 500 may precompost organic material feed into opening 111 and deliver the precomposted organic material to bin 300 which when housed in housing 100 collects the precomposted material.

It should be noted that "organic material" is one term for what the subject invention precomposter 10 may precompost or process. It is not the intention of the applicant to vary from this concept when referring to "kitchen scraps" or "scraps" or similar. While alternative embodiments of the subject inventions may include organic material which is not typically associated with the kitchen, referring to "kitchen scraps" and the like may be beneficial to the reader to put the use of precomposter 10 in that particular context.

The components, and their relationships, will now be described in greater detail.

Housing 100 may include beveled ridge 150 on 3 sides that will provide an ergonomic gripping surface to facilitate moving precomposter 10 in any upward and/or sideway direction. Because of the forces necessary for precomposting many organic kitchen scraps precomposter 10 may weigh approximately 8 pounds, which may not be easy for many users to move when reaching for precomposter 10 in a distal location with their arms. For example, it may be preferable to store precomposter 10 conveniently under a kitchen cabinet on a kitchen countertop which will require upward and horizontal forces to move precomposter 10 to and from such a distal storage location.

Users may prefer to precompost scraps when precomposter 10 is not under a kitchen cabinet—which require the movement thereof described above. Nevertheless, precomposter 10 may be designed to accommodate typical clearance between a kitchen countertop and upper kitchen cabinets—approximately 18 inches. A design of precomposter 10 has a height of less than 13 inches and a height of less than 17 inches when hatch lid 220 is fully open.

Beveled ridge 150 is depicted as continuous along the back and two sides of housing 100. Ridge 150 includes: back segment 151 which is horizontal; side horizontal segments 152*a* and 152*b* which are substantially horizontal; and side vertical segments 153*a* and 153*b* which are substantially vertical. There is no beveled ridge along the front side of housing 100.

Vertical segments 153*a* and 153*b* include a modest horizontal drift toward the back of housing 100 as they rise along the sides of housing 100. This enables a user, who for example will pull precomposter 10 out from under an upper kitchen cabinet, to exert a modest lifting force, which will lower the shear frictional force resulting from dragging feet 141*a-d* and/or cups 143*a* and 143*b* along the kitchen countertop, which may thereby make it easier to pull composter 10 to a countertop position which preferable to the user.

A beveled surface, in contrast to a 90 degree ridge, may provide a more ergonomical interface surface for a human hand or finger in that it may be more comfortable to engage and distribute loads over a greater area of the user's hand or fingers thereby making it easier for the user to move or orient precomposter 10.

The location of vertical segments 153*a* and 153*b* are preferably of the same design and location on each side of precomposter 10, so the user may more easily stabilize precomposter 10 when moving same by symmetrically engaging precomposter 10. The fore/aft position of segments 153*a* and 153*b* are preferable ergonomic in design. Ergonomic considerations include the center of mass of precomposter 10 and common means for grabbing and lifting precomposter 10. In particular side beveled ridge arcuate segments 154*a* and 154*b* are positioned such that a user may securely grab precomposter 10 by engaging 154*a* and 154*b* with her fingers and the main lid outer beveled surfaces 212*a-c* with the palmar region of her hand.

In an exemplary embodiment housing 100 can have a housing outer base 140 which includes housing feet 141*a-d* and suction cups 142*a* and 142*b*. The feet 141*a-d* and cups 142*a-b* are designed to all rest on a countertop, or other flat substantially horizontal surface, when precomposter 10 is at rest. At rest is to be distinguished from precomposter 10 suspended by for example a user utilizing beveled ridge 150 as described herein to lift precomposter 10. When precomposter 10 is suspended cups 142*a-b* will project slightly distal to precomposter 10—specifically slightly distal to the plane defined by the bottom of feet 141*a-d.*

When precomposter 10 is set upon a smooth substantially flat substantially horizontal surface in preparation for precomposting, cups 142*a-b* may form a seal with the surface, facilitated by the deformation of cups 142*a-b* when set upon such a surface. Cups 142*a-b* and said surface are preferably clean void of particulates or other substances which may compromise a seal. The user can then rotate cup levers 143*a-b* which may secure the seal with the for example countertop and as levers 143*a-b* are rotated cup diaphragms 144*a-b* create a progressively greater cavity (concave) which in turn creates a vacuum which in turn secures precomposter 10 to the countertop and thereby facilitates use of precomposter 10.

The design of lid assembly 200 in an exemplary design is also cognizant of the desire to secure precomposter 10 when in use. Main lid 210 is substantially square in general shape with a rectangular aperture 213 approximately centered therein. Main lid 200 includes main lid outer beveled surface 212*a*, main lid first inner beveled surface 212*b* and main lid second inner beveled surface 212*c*. Beveled surfaces 212*a* and 212*b* provide ergonomic surfaces which may allow the user to stabilize precomposter 10 when in use. The user may crank the crank assembly 700 with one hand and brace precomposter 10 with his other hand—in particular the palmar region of the hand.

Main lid second inner beveled surface 212*c* provides a shoot for directing kitchen scraps to and through main lid aperture 213. Hatch lid 220 may be rotatably affixed to main lid 210 at main lid hatch hinge 214, and may be secured in a closed position with main lid hatch latch 215 by means well known in the relevant arts. Preferably hatch lid 220 is approximately level with the junction between inner beveled surface 212*b* and second inner beveled surface 212*c* when in a closed or latched position. Hatch lid 220 and hatch hinge 214 are design to allow substantially full access to the aperture defined by the junction of first inner beveled surface 212*b* and second inner beveled surface 212*c* thereby not encumbering or blocking the delivery of kitchen scraps to main lid aperture 213.

Hatch lid 220 is preferably transparent. This allows the user to see organic material in hopper 500 as it is processed. While hopper 500 and blade assembly 600 are designed to cut organic material it should be noted other processes may result. Prototype tests of the subject invention indicate materials are not only cut, or shredded, by precomposter 10, but materials may also be mashed, or masticated, or similar. This may occur for a number of reason based upon the immutable laws of physics, but are apparent as a result of the no-bladed surfaces within hopper 500 and the forces exerted on materials by blade assembly 600 and how that may impact adjacent materials.

Watching the precomposting process may alert the user, for example, as to when it is prudent to reverse the rotation of blade assembly 600 or when it is prudent to take other action which may improve the precomposting process.

Main lid 210 is removably and rotatably affixed to the top of housing 100 at main lid hinge 130. Main lid hinge 130 and main lid hinge pin 211 are collectively designed to inhibit removal of main lid 210 from housing 100 except when main lid 210 is at approximately a 60 angle to housing 100 or specifically at approximately 60 degrees to main lid hinge 130 which means, generally, approximately 60 degrees to horizontal. This can be appreciated by noting the size, positioning and location of main lid hinge 130 generally and specifically main lid hinge arcuate cups 131*a* and 131*b* and main lid hinge arcuate gaps 132*a* and 132*b* vis-à-vis main lid hinge pin 211 generally and main lid hinge pin double-D segments 21 la and 211*b*. Arcuate gaps 132*a* and 132*b* are centered at approximately 60 degrees and define an arcuate gap of approximate 50 degree.

It may also be appreciated from the designs of main lid hinge 130 and main lid hinge 211 that main lid 210 will be at approximately 110 degrees when fully opened. Precomposter 10 may be dimensioned such that it fits under standard above-counter cabinets when main lid 210 is fully opened.

When main lid 210 and hatch lid 220 are rotatably closed they collectively cover first opening 111 in the top of housing 100.

When main lid 210 is closed and hatch lid 200 is opened kitchen scraps may be placed into the opening or aperture defined by main lid 210 which further defines first opening 111 in housing 100. In this exemplary embodiment means for composting are below first housing opening 111, namely hopper 500 and blade assembly 600.

To provide structural integrity and rigidity an exemplary embodiment includes component tray 400. Component tray 400 may be secured to the interior of housing 100, and hopper 500 may be secured to component tray 400. Blade assembly 600 is affixed to hopper 500, and crank assembly 700 is affixed to blade assembly 600. Rotating crank assembly 700 drives blade assembly axle 610 which in turn rotates blades 620*a-g* which in conjunction with fixed struts 630*a-f* shred the kitchen scraps placed through main lid aperture 213.

Housing 100 includes a second opening 112 which may be interfaced with bin 300. Bin 300 may slidably engage housing 100, specifically wherein a bin outside bottom surface 340 is design to slidably engage housing inside bottom surface 142. Bin 300 and housing 100 are design to position bin 300, when fully slid into housing 100, under hopper 500 so as to collect precomposted, that is shredded and/or cut and/or masticated, kitchen scraps. Bin 300 will collect, with the aid of gravity in this exemplary embodiment, such precomposted scraps.

A user of precomposter 10 may at her discretion either empty bin 300 of accumulated liquid or of the entire contents of bin 300. The nature of such precomposting typically creates quite a bit of liquid. And given the organic nature of kitchen scraps, the fact that precomposter 10 will typically be stored at room temperature and the fact that it may be desirable not to empty bin 300 every time scraps are precomposted—bin 300 may often become a prime host for bugs, bacteria, foul odors and other undesirables for the kitchen environment. Composter 10 is designed to address these issues in many ways.

Bin pour spout 320 is designed to enable the user to pour off such undesirable liquids without dumping the solid, or at least larger or cohered solid, precomposted materials in bin 300. Those users who do not have a larger bin to store precomposted material in the kitchen, which is not uncommon, may choose to empty bin 300 as infrequently as possible directly into an outdoor composting device or even an indoor composting device which may be relatively remote to their kitchen—thereby minimizing their inconvenience. Spout 320 is of a simple concave arcuate design to facilitate the pouring liquids from bin 300.

The inside bottom surface 160 of housing 100 includes bin interface channels 180*a-b* to slidably engage housing interface channels 341*a-b* on bin outside bottom surface 340.

Bin 300 also includes bin tabs 350*a-d* to engage specifically design bags (not shown) or the like which may facilitate disposal of pre-composted materials for certain users of precomposter 10.

Composter 10 includes a number of designs features which may mitigate such undesirable results of storing even small amounts of precomposted material. Bin inside bottom ridges 331 are designed to channel and accumulate liquids so they may be readily poured out of bin 300. Housing 100 is vented per housing vents 170. Housing 100 is designed to house hopper 500 but preferably hopper 500 is spaced an appreciable distance from the inside of housing 100 to allow for circulation of air inside precomposter 10. Additionally, bin 300 is over sized in relation to the bottom of hopper 500 thereby allowing for air to move from bin 300 around hopper 400. Component tray 400 includes perforations 410 designed to align with housing vents 170 allowing air to exit precomposter 10. Component tray 400 includes block receptacle 420 designed to receive a correspondingly designed block (not shown) which may house Xeolite, herbs or other substances which may mitigate orders, insects or other undesirable products of precomposted material(s) including those in bin 300.

Blade assembly 600 includes axle 610, blades 620*a-h*, struts 630*a-f* and miscellaneous bushings and spacers with means of use well known in the arts to allow axle 610 and blades 620*a-h*, removably fixed in place to axle 610, to rotate relative to fixed struts 630*a-f*, and fixed hopper 500. Moreover, the distal ends of struts 630*a-f* may be slid into hopper 500 from below wherein said distal ends slide into corresponding hopper channels 511*a-f* flange channels on one side of hopper 500 and hopper channels 511*g-n* on the other side of hopper 500.

Struts 630*a-f* may include holes at their ends (not shown) which align with hopper flanged rib holes (not shown). A hopper rod (not shown) may fix struts 630*a-f* to hopper 500. Flanged ribs 510*a-n* may provide addition structural integrity to hopper 500.

Hopper 500 may include a hopper handle 520 which may facilitate the removal of hopper 500, including blade assembly 600 for cleaning or repair. Preferably, hopper 500 may be easily disconnected from component tray 400 by means well known in the mechanical arts which may include utilization of hopper tabs 550*a-b*.

A crank assembly 700 may be releasably attached to the end of axle 610 by means well known in the mechanical arts wherein rotation of crank arm 710 affixed to axle 610 rotates blades 620*a-h* relative to fixed struts 630*a-f* and hopper 500. Organic material placed in first opening 111 will fall into hopper upper opening 530 whereupon rotating blades 620*a-h* will mechanically process, including cutting, the organic material. Cutting is enhanced by the design of struts 630*a-f* which may include concave segments 631*a* and 631*b* which may vary in curvature from strut to strut or even on a single strut. A concave design may cradle organic material to be shredded by blades 620*a-h* such cradling tends to hold the material in place while significant forces are exerted on the material by one or more of blades 620*a-h*.

Figure 6A:
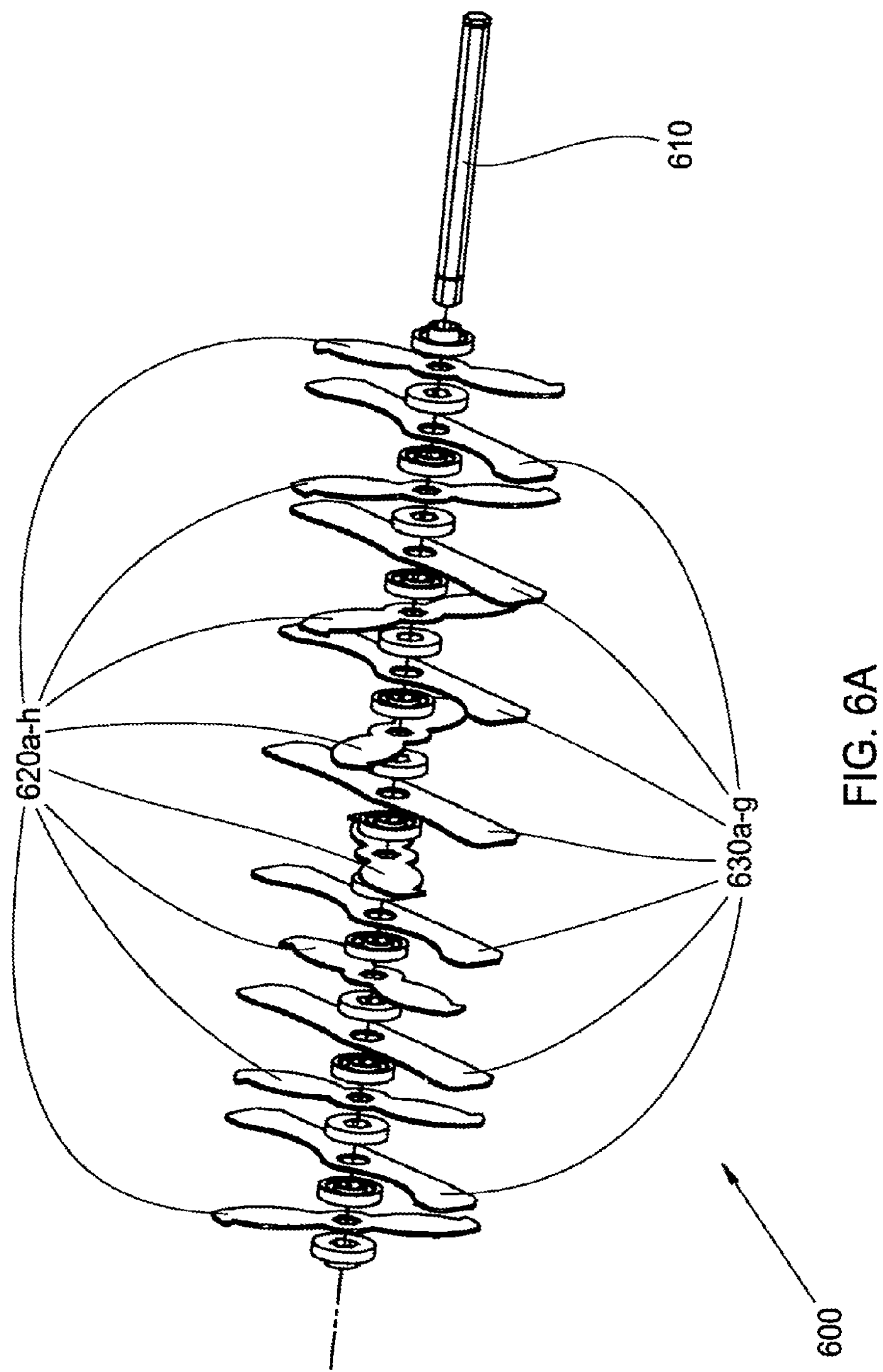
Figure 6B:
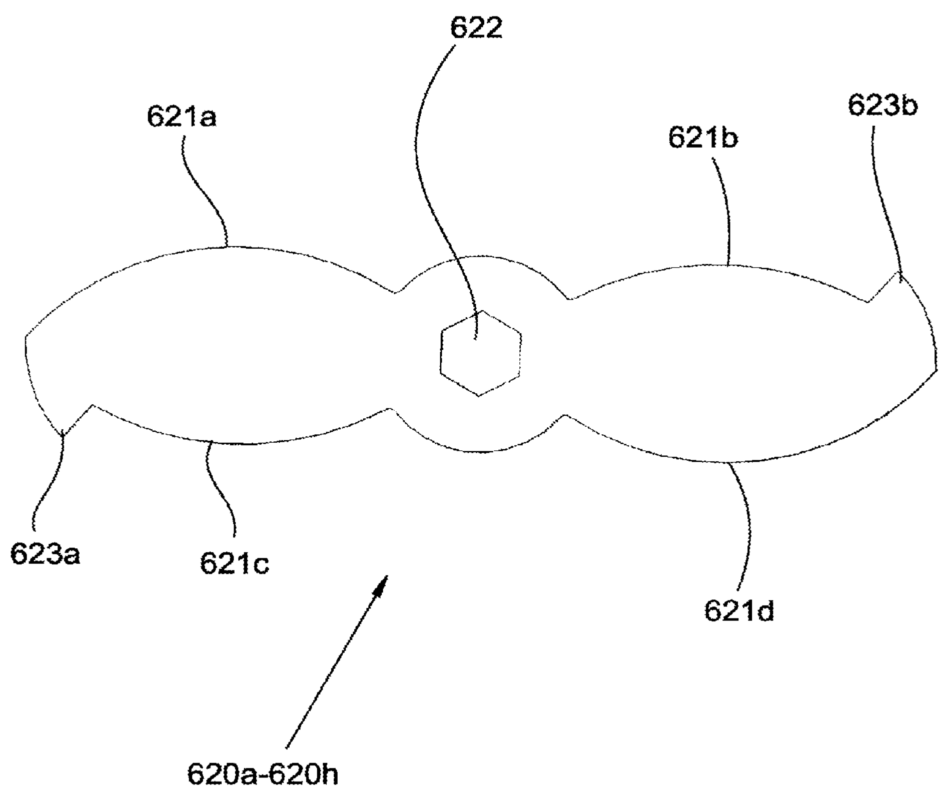
Figure 6C:
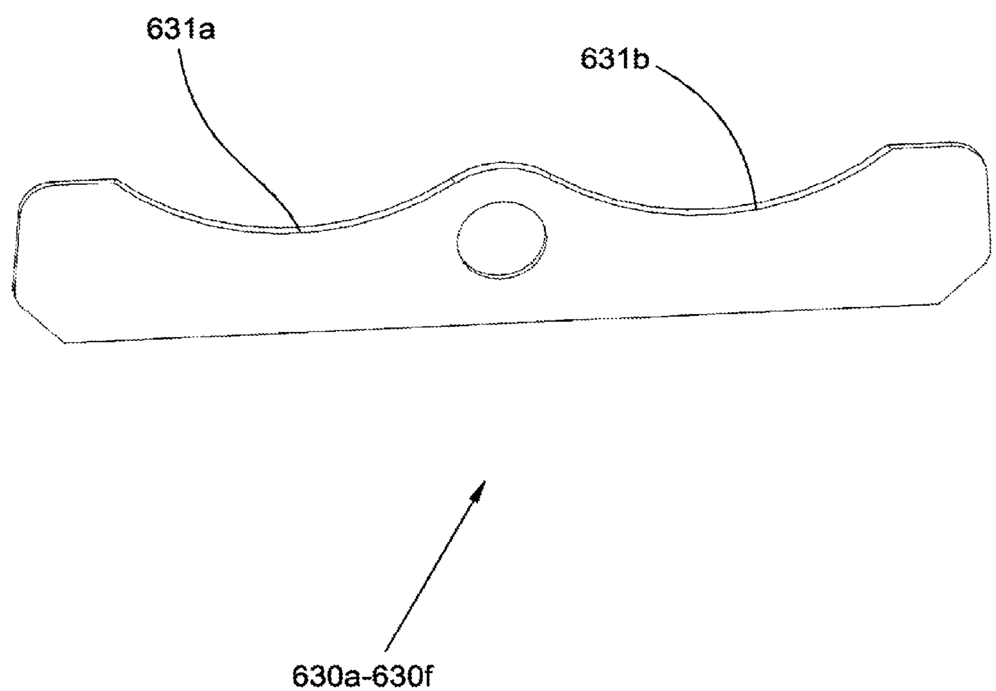
Figure 7:
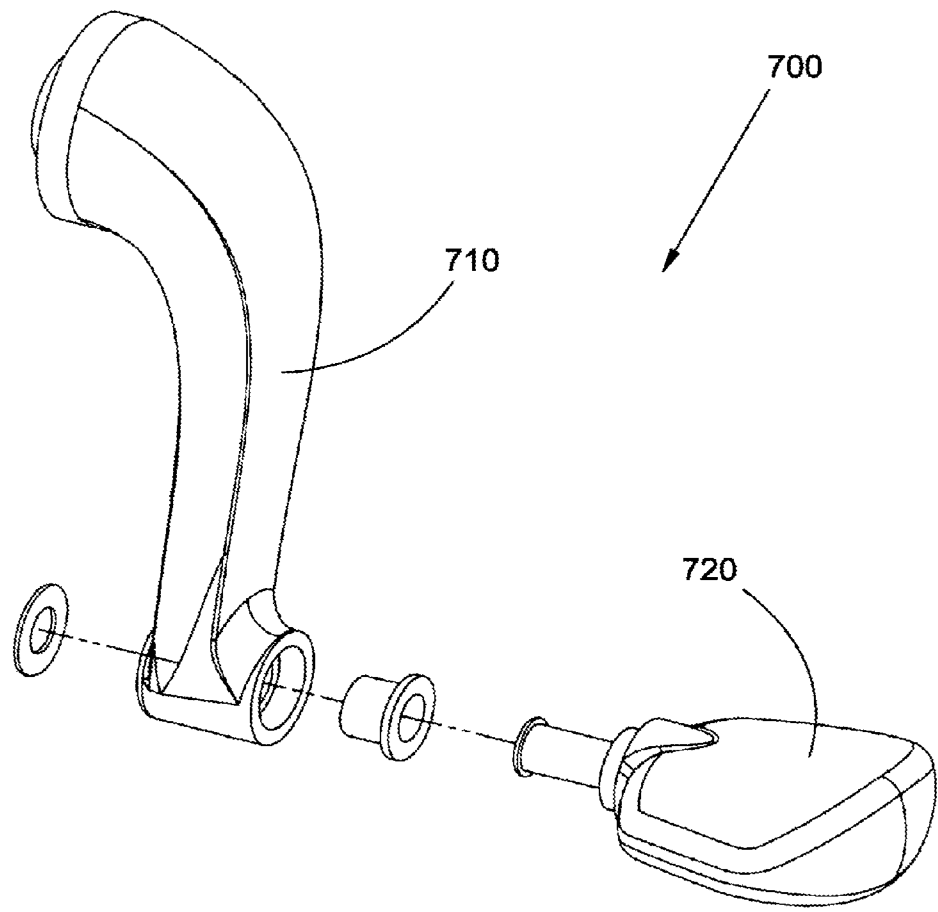
FIG. 7 is an exploded perspective view of a crank arm assembly

The specific blade design depicted in FIG. 6*b* has a number of potential benefits. Curved portions 621*a-d* may vary the point of greatest force on the material facilitating the cutting of tougher materials. If material stick to the interior walls of hopper 500 hooks 623*a* and 623*b* may pull material of said walls. The direct drive design allows hooks 623*a* and 623*b* to reverse direction to assist in such dislodging. In an alternative embodiment curve blade segments 621*a* and 621*b* may have a sharp edge to cut material whereas 621*c* and 621*c* may have a duller edge to enhance masticating or crushing material. Alternatively, a precomposter 10 which does not rely on the assistance of gravity, or relies less on gravity, hooks 623*a-b* may grab and pull organic material into the precomposting mechanism.

A hex shaped axle 610 may correspond to a hex shaped aperture 622 in blades 620*a-h*. Preferably blades 621-*h* are 60 degrees out of phase wherein two pairs of blades (620*a* and 620*g*, and 620*b* and 620*h*) are always in the same rotational position. Other cross-sectional shapes may be functionally equivalent for axle 610 and blade aperture 622.

Figure 8:
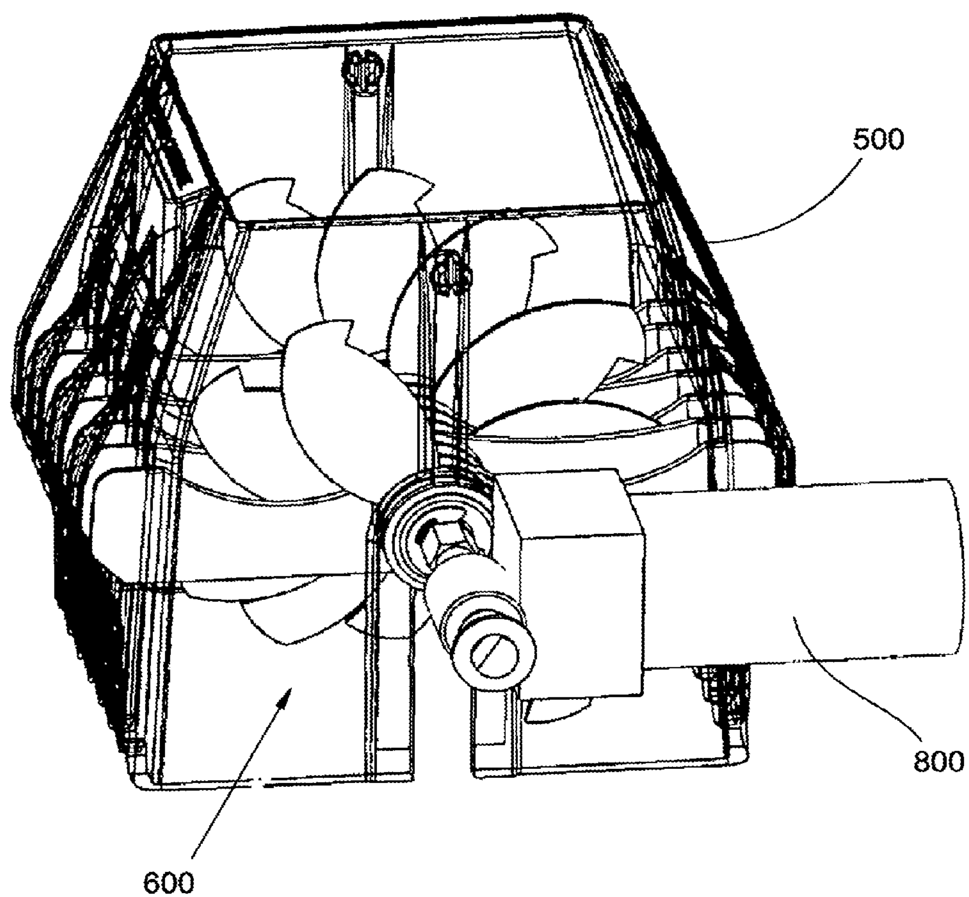
FIG. 8 is perspective partially transparent side view of a hopper, a blade assembly and a crank motor.

Crank assembly 700 includes crank handle 720 which may be ergonomically design to comfortably receive the palmar region of a human hand which may facilitate rotating crank arm 710 in a clockwise or counterclockwise direction. Alternatively, a gearing mechanism (not shown) well known in the arts may vary the 1 to 1 ratio of crank handle rotation and axle 610 and blades 620*a-h* rotation. Alternatively, as depicted in FIG. 8 an internal electric motor, or the like, generically depicted as 810 could be included to power the rotation of blades a-h and axle 610.

Alternatively, in an alternative exemplary embodiment the precomposter may be simply comprised of a housing with two openings and precomposting means therebetween. In such an embodiment means well known in the mechanical arts would allow for an axle to be rotatably fixed at its distal ends to a housing wherein a blade would be removably fixed to the axle and a strut would be fixed to the interior of the housing.

It is intended that equivalents of the disclosed exemplary embodiments, alternative embodiments and/or preferred embodiments and methods shall fall within the scope of the present disclosure and claims—or as amended. It is intended that the disclosed embodiments and methods, and equivalents thereof, may be modified while remaining within the scope of the present disclosure or claims or so appended.

For the purposes of the present disclosure and appended claims, the conjunction "or" is to be construed inclusively (e.g., "a dog or a cat" would be interpreted as "a dog, or a cat, or both"; e.g., "a dog, a cat, or a mouse could be interpreted as "a dog, or a cat, or a mouse, or any two, or all three"), unless: (i) it is explicitly stated otherwise, e.g., but use of "either . . . or", "only on of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. A portable shredder for precomposting household organic material, the shredder comprising:

a removable hopper having an upper opening and lower opening, a front side, a rear side, a left side, and a right side, wherein:

the size of said upper opening is smaller than the size of said lower opening, whereby the movement of organic material being shredded will be biased to move toward the larger lower opening, said hopper has a plurality of rigid and substantially stationary struts disposed within said hopper, each of said struts spans from one end to said front side of said hopper to the other end to said rear side of said hopper, said each of said struts has a side profile that is different from at least one other of said plurality of struts, and each of said plurality of struts is configured to receive a rotatable axle through its central region, said rotatable axle being rotatably mounted on each end to said left and right sides of said hopper and said axle being able to rotate independently of said substantially stationary struts, and said rotatable axle is comprised of a plurality of blades that are fixedly mounted to said axle and rotate with said axle, each of said blades being angularly offset about said axle relative to the angular position of the next-closest blade on each side of the blade, and one of said stationary struts disposed between any two rotatable blades; and whereby when said axle and its blades are rotated relative to said hopper's stationary struts, in either direction, organic material that is introduced to said hopper's upper opening is drawn between said stationary struts by said rotating blades and is caused to exit through said lower opening in a precomposted state.

2. The shredder of claim 1, further comprising:

a housing having front, rear, left, and right sides, and having a removable and closable top lid adapted to facilitate the installation or removal of said removable hopper; and a removable, open-topped bin that is slidably received within said housing through a front opening in said housing;

wherein said removable, open-topped bin is in communicatively coupled to said removable and closable top lid in said housing via said removable hopper that is intermediately positioned between said closable top opening and said removable, open-topped bin, said bin positioned to receive any organic material passed through the top of said housing and through said hopper' lower opening.

3. The shredder of claim 2, wherein said housing's top lid incorporates a second interior and smaller hinged lid through which organic material can be inserted for shredder operations.

4. The shredder of claim 3, wherein said smaller hinged lid for inserting organic material is of made of a substantially transparent material.

5. The shredder of claim 2, wherein said removable, open-topped bin includes a plurality of protruding ridges on the bottom interior surface of said bin whereby said ridges create channels to help separate solids from any liquids that accumulate in said bin after shredding operations.

6. The shredder of claim 2, wherein said removable, open-topped bin includes:

an outer handle for slidably removing and reinstalling said bin into said housing; and a pour spout adapted to allow a user to pour liquid from said bin.

7. The shredder of claim 2, wherein said housing further comprises:

at least one substantially vertical ridge on the outer surface of each of said left and right sides to facilitate user gripping to help move the shredder horizontally as necessary; and at least one substantially horizontal ridge on the outer surface of each of said left and right sides to facilitate user gripping to help move the shredder vertically as necessary.

8. The shredder of claim 2, wherein said housing's bottom outer surface further comprises one or more feet in order to facilitate the stabilization of the shredder to a substantially horizontal and smooth surface in preparation for shredder operations, wherein:

each said foot is equipped with an adjustable suction cup, a rotatable cup diaphragm, and a lever for rotating said cup diaphragm; and rotating said lever and its associated cup diaphragm can adjust the cavity of the associated suction cup, and when increasing said cavity, the vacuum created is also increased, thus improving the seating seal of the associated suction cup.

9. The shredder of claim 2, wherein said housing inner surface further comprises a receptacle adapted to removably hold an odor-mitigating material.

10. The shredder of claim 9, wherein said odor-mitigating material is selected from the group consisting of Xeolite and herbs.

11. The shredder of claim 2, wherein:

said removable hopper is slidably engaged with said housing; and said removable hopper is equipped with a hinged lifting handle.

12. The shredder of claim 11, wherein said axle rotation is configured to be driven by a means selected from the group consisting of manual power from a user via a hand crank operatively coupled to said axle and an electric motor operatively coupled to said axle.

13. The shredder of claim 12, wherein said axle driving means is removably coupled to said axle.

14. The shredder of claim 1, wherein:

at least one of said plurality of blades has two operable edges extending from said axle mounting; and each said blade has at least one convex operable edge.

15. The shredder of claim 1, wherein:

at least one of said plurality of blades has two operable edges extending from said axle mounting; and the end of each said blade has at least one hook protrusion.

16. The shredder of claim 1, wherein at least one of said plurality of blades has at least one sharpened edge.

17. The shredder of claim 16, wherein at least one of said plurality of blades has opposed sharpened edges.

18. The shredder of claim 1, wherein at least one of said plurality of stationary struts has an upper edge that is concaved.

19. The shredder of claim 18, wherein:

multiple stationary struts have an upper edge that is concaved; and the concavity of the upper edge of at least two of said stationary struts differ from each other.

20. The shredder of claim 1, wherein at least one of said plurality of stationary struts has at least a portion of a sharpened upper edge.

21. The shredder of claim 1, wherein said hopper further comprises:

a plurality of pairs of vertical channels disposed in both the front and the rear of said hopper, and each vertical channel is adapted to slidably receive one end of one of said plurality of struts at the bottom of said hopper, with its counterpart channel adapted to slidably receive the other end of the same strut, whereby each such strut can then be slidably disposed into its substantially fixed position at the top of its associated channel;

whereby the open nature of said plurality of vertical channels at the bottom of said hopper facilitates easier cleaning and/or disassembly of said hopper.

22. The shredder of claim 21, wherein the bottom edge of a hopper flange between each said vertical channel is substantially rounded to eliminate sharp edges in order to facilitate easier alignment of said struts when inserting each strut during reassembly.

23. The shredder of claim 1, wherein at least a portion of an interior surface of the sides of said hopper has an inverted slope in order to help bias the movement of organic material being shredded toward the larger lower opening of said hopper.

24. A method of making a portable shredder for precomposting household organic material, the method comprising the step of:

providing a removable hopper having an upper opening and lower opening, a front side, a rear side, a left side, and a right side, wherein:

the size of said upper opening is smaller than the size of said lower opening, whereby the movement of organic material being shredded will be biased to move toward the larger lower opening, said hopper has a plurality of rigid and substantially stationary struts disposed within said hopper, each of said struts spans from one end to said front side of said hopper to the other end to said rear side of said hopper, said each of said struts has a side profile that is different from at least one other of said plurality of struts, and each of said plurality of struts is configured to receive a rotatable axle through its central region, said rotatable axle being rotatably mounted on each end to said left and right sides of said hopper and said axle being able to rotate independently of said substantially stationary struts, and said rotatable axle is comprised of a plurality of blades that are fixedly mounted to said axle and rotate with said axle, each of said blades being angularly offset about said axle relative to the angular position of the next-closest blade on each side of the blade, and one of said stationary struts disposed between any two rotatable blades; and whereby when said axle and its blades are rotated relative to said hopper's stationary struts, in either direction, organic material that is introduced to said hopper's upper opening is drawn between said stationary struts by said rotating blades and is caused to exit through said lower opening in a precomposted state.

25. The method of claim 24, further comprising the steps of:

providing a housing having front, rear, left, and right sides, and having a removable and closable top lid adapted to facilitate the installation or removal of said removable hopper; and providing a removable, open-topped bin that is slidably received within said housing through a front opening in said housing;

wherein said removable, open-topped bin is in communicatively coupled to said removable and closable top lid in said housing via said removable hopper that is intermediately positioned between said closable top opening and said removable, open-topped bin, said bin positioned to receive any organic material passed through the top of said housing and through said hopper' lower opening.

26. The method of claim 25, wherein said housing's top lid incorporates a second interior and smaller hinged lid through which organic material can be inserted for shredder operations.

27. The method of claim 26, wherein said smaller hinged lid for inserting organic material is of made of a substantially transparent material.

28. The method of claim 25, wherein said removable, open-topped bin includes a plurality of protruding ridges on the bottom interior surface of said bin whereby said ridges create channels to help separate solids from any liquids that accumulate in said bin after shredding operations.

29. The method of claim 25, wherein said removable, open-topped bin includes:

an outer handle for slidably removing and reinstalling said bin into said housing; and a pour spout adapted to allow a user to pour liquid from said bin.

30. The method of claim 25, further comprising the step of providing said housing with:

at least one substantially vertical ridge on the outer surface of each of said left and right sides to facilitate user gripping to help move the shredder horizontally as necessary; and at least one substantially horizontal ridge on the outer surface of each of said left and right sides to facilitate user gripping to help move the shredder vertically as necessary.

31. The method of claim 25, further comprising the step of providing said housing with one or more adjustable suction cups to said housing's bottom outer surface in order to facilitate the stabilization of the shredder to a substantially smooth surface in preparation for shredder operations.

32. The method of claim 25, further comprising the step of providing said housing's bottom outer surface with one or more feet in order to facilitate the stabilization of the shredder to a substantially horizontal and smooth surface in preparation for shredder operations, wherein:

each said foot is equipped with an adjustable suction cup, a rotatable cup diaphragm, and a lever for rotating said cup diaphragm; and rotating said lever and its associated cup diaphragm can adjust the cavity of the associated suction cup, and when increasing said cavity, the vacuum created is also increased, thus improving the seating seal of the associated suction cup.

33. The method of claim 25, further comprising the step of providing said housing inner surface with a receptacle adapted to removably hold an odor-mitigating material.

34. The method of claim 33, wherein said odor-mitigating material is selected from the group consisting of Xeolite and herbs.

35. The method of claim 25, wherein:

said removable hopper is slidably engaged with said housing; and said removable hopper is equipped with a hinged lifting handle.

36. The method of claim 35, wherein said axle rotation is configured to be driven by a means selected from the group consisting of manual power from a user via a hand crank operatively coupled to said axle and an electric motor operatively coupled to said axle.

37. The method of claim 36, wherein said axle driving means is removably coupled to said axle.

38. The method of claim 24, wherein:

at least one of said plurality of blades has two operable edges extending from said axle mounting; and each said blade has at least one convex operable edge.

39. The method of claim 24, wherein:

at least one of said plurality of blades has two operable edges extending from said axle mounting; and the end of each said blade has at least one hook protrusion.

40. The method of claim 24, wherein at least one of said plurality of blades has at least one sharpened edge.

41. The method of claim 40, wherein at least one of said plurality of blades has opposed sharpened edges.

42. The method of claim 24, wherein at least one of said plurality of stationary struts has an upper edge that is concaved.

43. The method of claim 42, wherein:

multiple stationary struts have an upper edge that is concaved; and the concavity of the upper edge of at least two of said stationary struts differ from each other.

44. The method of claim 24, wherein at least one of said plurality of stationary struts has at least a portion of a sharpened upper edge.

45. The method of claim 24, wherein said method further comprises the step of:

providing said hopper with a plurality of pairs of vertical channels disposed in both the front and the rear of said hopper, and each vertical channel is adapted to slidably receive one end of one of said plurality of struts at the bottom of said hopper, with its counterpart channel adapted to slidably receive the other end of the same strut, whereby each such strut can then be slidably disposed into its substantially fixed position at the top of its associated channel;

whereby the open nature of said plurality of vertical channels at the bottom of said hopper facilitates easier cleaning and/or disassembly of said hopper.

46. The method of claim 45, wherein the bottom edge of a hopper flange between each said vertical channel is substantially rounded to eliminate sharp edges in order to facilitate easier alignment of said struts when inserting each strut during reassembly.

47. The method of claim 24, wherein at least a portion of an interior surface of the sides of said hopper has an inverted slope in order to help bias the movement of organic material being shredded toward the larger lower opening of said hopper.

* * * * *